United States Patent
Girard et al.

(10) Patent No.: US 11,591,182 B2
(45) Date of Patent: Feb. 28, 2023

(54) PRESENCE DETECTION SYSTEM AND METHOD

(71) Applicant: Girard Larivière Inc., Sainte-Julie (CA)

(72) Inventors: Claude Girard, Sainte-Julie (CA); Josée Larivière, Sainte-Julie (CA); Philippe Girard, Sainte-Julie (CA)

(73) Assignee: Girard Larivière Inc., Sainte-Julie (CA)

( * ) Notice: Subject to any disclaimer, the term of this patent is extended or adjusted under 35 U.S.C. 154(b) by 391 days.

(21) Appl. No.: 16/626,006

(22) PCT Filed: Jun. 4, 2019

(86) PCT No.: PCT/CA2019/050775
§ 371 (c)(1),
(2) Date: Dec. 23, 2019

(87) PCT Pub. No.: WO2019/232624
PCT Pub. Date: Dec. 12, 2019

(65) Prior Publication Data
US 2020/0354190 A1 Nov. 12, 2020

Related U.S. Application Data

(60) Provisional application No. 62/680,744, filed on Jun. 5, 2018.

(51) Int. Cl.
*B66B 1/34* (2006.01)
*G07C 9/28* (2020.01)
(Continued)

(52) U.S. Cl.
CPC .............. *B66B 1/3476* (2013.01); *G01V 8/20* (2013.01); *G07C 9/28* (2020.01); *G07C 9/29* (2020.01); *G07C 9/25* (2020.01)

(58) Field of Classification Search
CPC .......... B66B 1/3476; G01V 8/20; G01V 9/00; G07C 9/28; G07C 9/29; G07C 9/25;
(Continued)

(56) References Cited

U.S. PATENT DOCUMENTS 5,131,508 A * 7/1992 Suzuki ................... H04M 11/04
187/391
5,435,416 A 7/1995 Siikonen et al.
(Continued)

FOREIGN PATENT DOCUMENTS

JP H08119547 A 5/1996
KR 20100011627 U 12/2010
(Continued)

OTHER PUBLICATIONS

Written Opinion of the International Searching Authority, dated Jul. 31, 2019, for International Patent Application for No. PCT/CA2019/050775; 4 pages.
(Continued)

*Primary Examiner* — Nam V Nguyen
(74) *Attorney, Agent, or Firm* — Faegre Drinker Biddle & Reath

(57) ABSTRACT

A presence detection system includes a support layer operable to act as an underlying surface for supporting object(s), a sensor layer disposed beneath the support layer and operable to output readings indicating the presence of object(s) supported on the support layer and a controller for receiving the presence readings from the sensor layer and determining, based on the readings, an indicator of the occupancy status and/or an occupancy level of the support layer. The presence detection system can be used within an access gate system whereby the access gate is operated to a blocking position upon the presence detection system detecting more than one human supported on the support layer,
(Continued)

this operation overriding a reading of an authenticated user token. The presence detection system can also be used within an elevator system wherein the elevator door subsystem and the elevator displacement subsystem are controlled based on an occupancy level detected by the detection system. Methods for detecting object are also contemplated.

28 Claims, 23 Drawing Sheets

(51) Int. Cl.
  *G07C 9/29* (2020.01)
  *G01V 8/20* (2006.01)
  *G07C 9/25* (2020.01)

(58) Field of Classification Search
  CPC ............ G07C 9/00174; G07C 9/00944; G07C 2209/64; G07C 9/10; G07C 9/20; G07C 9/30
  USPC .......................................... 340/5.7; 187/392
  See application file for complete search history.

(56) References Cited

U.S. PATENT DOCUMENTS

| | | | |
|---|---|---|---|
| 5,845,692 A | | 8/1998 | Kellem et al. |
| 6,615,175 B1 | | 9/2003 | Gazdzinski |
| 8,276,816 B2 * | 10/2012 | Gardner | ............. G06K 19/0718 |
| | | | 235/440 |
| 8,336,678 B2 * | 12/2012 | Poutiainen | ............. B66B 1/463 |
| | | | 187/395 |
| 8,960,373 B2 | | 2/2015 | De Vincentis |
| 9,158,958 B2 * | 10/2015 | Wickboldt | ............. H04L 9/3231 |
| 10,235,854 B2 * | 3/2019 | Trani | .................... H04W 4/021 |
| 10,262,179 B2 * | 4/2019 | Miller | .................. H03K 17/962 |
| 10,268,282 B2 * | 4/2019 | Tian | ....................... G06F 3/0334 |
| 10,358,319 B2 | | 7/2019 | Salmikuukka et al. |
| 10,776,523 B2 | | 9/2020 | Ahokas et al. |
| 2005/0094855 A1 * | 5/2005 | Proano | ............... G06V 40/1306 |
| | | | 382/124 |
| 2015/0005951 A1 * | 1/2015 | Srinivasan | ............. G05B 15/02 |
| | | | 700/275 |
| 2016/0320525 A1 * | 11/2016 | Brigham | ................. G09F 27/00 |
| 2018/0074466 A1 * | 3/2018 | Witczak | ................. G05B 11/01 |
| 2019/0139254 A1 * | 5/2019 | Mochizuki | ........... G06Q 10/043 |
| 2019/0218059 A1 | | 7/2019 | Backlund |
| 2019/0346588 A1 * | 11/2019 | Hsu | .......................... G01V 9/00 |
| 2020/0239283 A1 | | 7/2020 | Lou et al. |

FOREIGN PATENT DOCUMENTS

| | | |
|---|---|---|
| KR | 101483957 | 1/2015 |
| KR | 101483957 B1 | 1/2015 |
| WO | 2008013515 | 1/2008 |
| WO | 2011012768 | 2/2011 |

OTHER PUBLICATIONS

International Search Report issued by the International Searching Authority, dated Aug. 12, 2019, for International Patent Application No. PCT/CA2019/050775; 4 pages.
Extended European Search Report for EP19814079 to Girard Lariviere Inc. dated Jan. 31, 2022 (9 pgs).

* cited by examiner

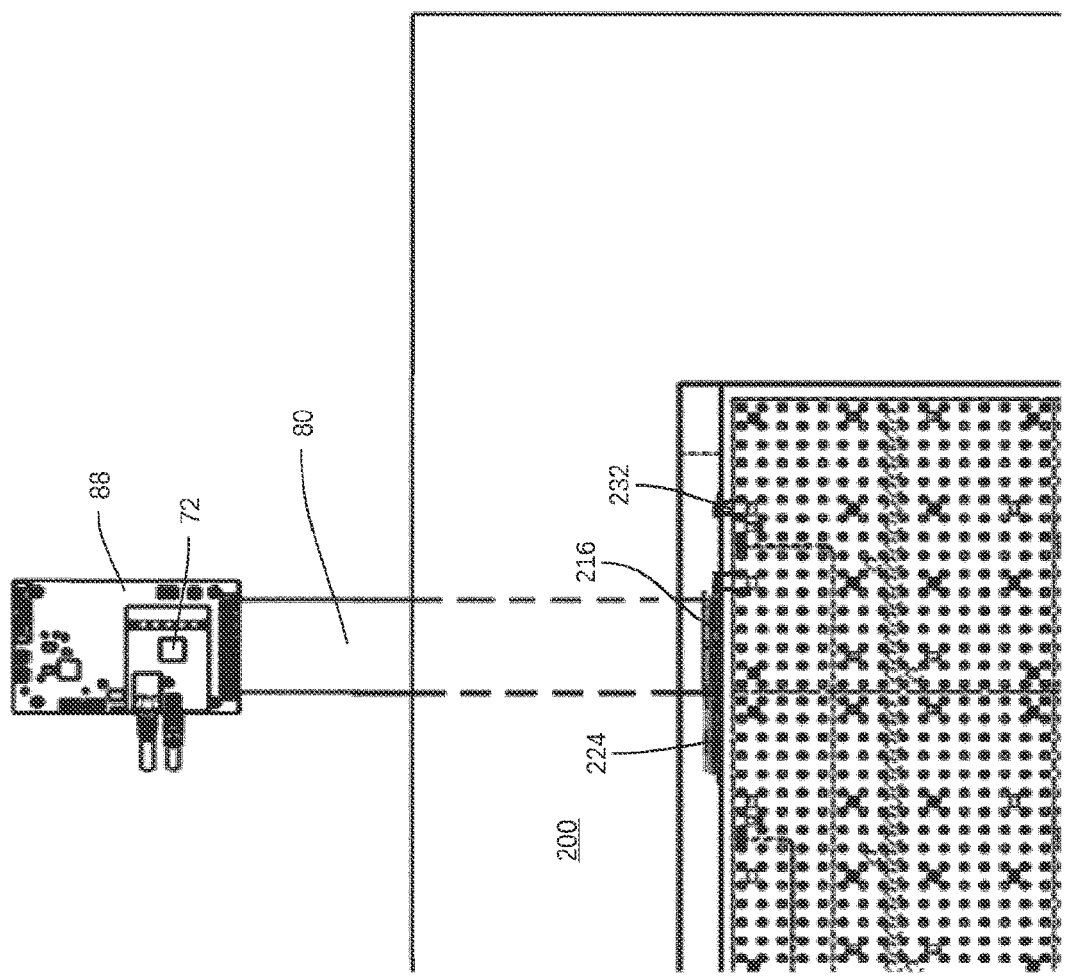

PRESENCE DETECTION SYSTEM AND METHOD

RELATED PATENT APPLICATIONS

The present application is a national stage entry of International (PCT) Patent Application Number PCT/CA2019/050775, filed Jun. 4, 2019, which in turn claims priority from U.S. provisional patent application No. 62/680,744, filed Jun. 5, 2018 and entitled "PRESENCE DETECTION SYSTEM AND METHOD", the disclosure of which are hereby incorporated by reference in its entirety.

TECHNICAL FIELD

The present disclosure generally relates to presence detection and system operable to detect the presence of objects (humans, other living beings, and/or non-living objects) being supported on a support layer, and more particularly, carrying out the detection using a sensor layer disposed beneath the support layer.

BACKGROUND

Detecting the number of persons and/or objects in a given location can provide important information in various applications. For example, access control is an important application within the security industry.

An access control system is used to ensure that only authorized persons are granted access to a controlled area. Automated access gates can be used to selectively grant access to the controlled area. The determination of authorization can be based on a person providing an authorization token, such as a password, biometric information, or machine-readable token (ex: an access keycard). A drawback in such systems is ensuring that only the authorized person enters the controlled area each time that an access gate is opened to grant access. In a "tailgating" situation, a non-authorized person will follow an authorized person through the access gate after the authorized person has provided the authorization token and before the access gate is closed. This situation can be addressed by detecting the number of people passing through the gate at any one time and ensuring that the access gate remains open only for the authorized number of people.

Detecting the number of persons and/or objects can also be useful in various other applications.

SUMMARY

According to one aspect, there is provided a presence detection system that includes a support layer operable to act as an underlying surface for supporting one or more objects, a sensor layer disposed beneath the support layer and operable to output readings indicating the presence of one or more objects supported on the support layer and a controller. The controller is configured for receiving the presence readings from the sensor layer and determining, based on the readings, an indicator of the occupancy status of the support layer.

According to systems described herein according to various embodiments, the sensor layer comprises a plurality of sensors arranged in an array, each sensor being located under a corresponding subarea of the support layer and being configured to output a respective sensor reading indicating the presence of an object on said subarea of the support layer.

According to systems described herein according to various embodiments, the indicator of the number of humans being supported on the support layer indicates a number of human feet being supported on the support layer and the determining comprises: detecting, based on the sensor readings, one or more groups of adjacently located sensors having readings indicating the presence of an object and determining, for each group, from the readings, whether the readings for the group are representative of the presence of a human foot.

According to another aspect, there is provided a presence detection system that includes a support layer operable to act as an underlying surface for supporting one or more objects, a sensor layer disposed beneath the support layer and operable to output readings indicating the presence of one or more objects supported on the support layer, and a controller. The controller is configured for receiving the presence readings from the sensor layer and determining, based on the readings, an indicator of an occupancy level of the support layer by objects being supported on the support layer.

According to systems described herein according to various embodiments, the indicator of the occupancy level of the support layer by objects being supported on the support layer indicates a percentage of the area of the support layer being occupied by the objects.

According to systems described herein according to various embodiments, the sensor layer comprises a plurality of photosensors each operable to output a respective reading indicating whether an object supported on the support layer is obstructing light thereto.

According to systems described herein according to various embodiments, the photosensors are chosen from one of photoresistors, phototransistors, infra-red sensors, photodiodes and photovoltaic sensors.

According to systems described herein according to various embodiments, the support layer is partially translucent.

According to systems described herein according to various embodiments, the support layer reduces visibility of the sensor layer through the top surface of the support layer.

According to systems described herein according to various embodiments, a top surface of the support layer is an anti-slip surface.

According to systems described herein according to various embodiments, the support layer comprises a sub-layer formed of a translucent film.

According to another aspect, there is provided an access gate system that includes the presence detection system described herein according to various example embodiments, an authentication token reader configured for reading a user token, an access gate operable between a blocking position and an access position, and an access controller operatively connected to the presence detection system. The access controller is configured for operating the access gate from the blocking position to the access position in response to reading an authenticated user token by the authentication token reader and upon the presence detection system detecting more than one human being supported on the support layer, operating the access gate to the blocking position, wherein said operating of the access gate overrides the reading of the authenticated user token.

According to access gate systems described herein according to various embodiments, detecting more than one human being supported on the support layer comprises detecting one human and at least one non-human object being supported on the support layer.

According to access gate systems described herein according to various embodiments, detecting more than one human being supported on the support layer comprises detecting at least three feet being supported on the support layer.

According to access gate systems described herein according to various embodiments, detecting more than one human being supported on the support layer comprises detecting two or more humans being supported on the support layer.

According to access gate systems described herein according to various embodiments, the access gate system may further include a plurality of flooring elements surrounding the support layer, wherein a top surface of the support layer is substantially level with the top surface of the flooring elements.

According to another aspect, there is provided an elevator system that includes an elevator cabin having cabin doors and a cabin floor, an elevator door subsystem operable to selectively open and close the cabin doors, an elevator displacement subsystem operable to selectively displace the elevator cabin upwardly, displace the elevator cabin downwardly, and pause displacement of the elevator cabin downwardly, the presence detection system described herein according to various example embodiments being positioned over the cabin floor of the elevator cabin, and an elevator operation controller operatively connected to the presence detection system, the elevator door subsystem and the elevator displacement subsystem and configured for controlling the elevator door subsystem and the elevator displacement subsystem based on the indicator of the occupancy level of the support layer by objects being supported on the support layer.

The elevator system may further include a user input subsystem for receiving user inputted commands for calling the elevator cabin and the elevator operation controller may be configured for if the occupancy level of the support layer exceeds a predetermined occupancy threshold during a downwardly operation of the elevator cabin, operating the elevator displacement subsystem to continue downward displacement of the elevator cabin and overriding received user inputted commands requesting entering the elevator cabin.

According to yet another aspect, there is provided a method for detecting presence. The method includes detecting, using a sensor layer disposed beneath a support layer, one or more objects supported on the support layer and determining, based on readings outputted from the sensor layer, an indicator of an occupancy status of the support layer by objects being supported on the support layer.

According to methods described herein according to various embodiments, the indicator of the occupancy status of the support layer by objects being supported on the support layer indicates a percentage of the area of the support layer being occupied by the objects.

According to methods described herein according to various embodiments, the indicator of the occupancy status of the support layer by objects being supported on the support layer indicates a number of human feet being supported on the support layer.

According to methods described herein according to various embodiments, the sensor layer comprises a plurality of sensors arranged in an array, each sensor being located under a corresponding subarea of the support layer and being configured to output a respective sensor reading indicating the presence of an object on said subarea of the support layer and determining the number of human feet being supported on the support layer includes detecting, based the readings, one or more groups of adjacently located sensors having readings indicating the presence of an object, and determining, for each group, from the readings, whether the readings for the group are representative of the presence of a human foot.

According to methods described herein according to various embodiments, the method further includes reading, by an authentication device, a user token, in response to reading an authenticated user token, operating an access gate to an access position, and upon determining more than one human being supported on the support layer, operating the access gate to a blocking position, wherein said operating of the access gate overrides the reading of the authenticated user token.

According to methods described herein according to various embodiments, detecting more than one human being supported on the support layer comprises detecting one human and at least one non-human object being supported on the support layer.

According to methods described herein according to various embodiments, detecting more than one human being supported on the support layer comprises detecting at least three feet being supported on the support layer.

According to methods described herein according to various embodiments, detecting more than one human being supported on the support layer comprises detecting two or more humans being supported on the support layer.

According to yet another aspect, there is provided a sensor board that includes a first planar substrate, a plurality of sensors arranged in an array over a surface of the planar substrate, each sensor being configured to detect the presence of an object in a space immediately above the sensor and to output a presence reading indicating the detected presence, and a first set of at least one multiplexer for receiving the presence readings from the plurality of sensors and for outputting a board-level combined presence reading signal.

According to sensor boards described herein according to various example embodiments, the plurality of sensors are a plurality of photosensors, each being oriented to detect presence of light in a direction transverse to the first planar substrate. According to yet another aspect, there is provided a modular sensor layer including at least two sensor boards described herein according to various example embodiments, the sensor boards being arranged planarly in an array, and a second set of at least one multiplexer for receiving the board-level combined presence reading signals and for outputting a layer-level combined presence reading signal.

According to the modular sensor layer described herein according to various example embodiments, the layer further includes a second planar substrate for supporting the at least two sensor boards and providing electrical connections for connecting the output of the first set of multiplexers of the sensor boards to the second set of at least one multiplexer.

According to the modular sensor layer described herein according to various example embodiments, the layer further includes an interface for transmitting the layer-level combined presence reading signal to a controller configured for receiving the presence reading signal and determining, based on the reading signal, an indicator of occupancy level of objects being present over the modular sensor layer.

According to the modular sensor layer described herein according to various example embodiments, the second planar substrate is an anti-static layer.

According to the modular sensor layer described herein according to various example embodiments, the controller comprises a synchronization module for emitting a respective switching control signal to each of the multiplexers of the first set and each of the multiplexers of the second set to sequentially receive at the controller presence reading signals from the plurality of sensors of the at least two sensor boards.

According to the modular sensor layer described herein according to various example embodiments, the controller applies a time delay after transmission of each switching control signal to the multiplexers before sampling the presence reading signal, the time delay being sufficiently long to allow a voltage fall or rise in the presence reading signal caused from the switching control signal to stabilize.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 4E illustrates a plan view of the flooring surrounding the presence detection system according to an example embodiment;

Figure 1A:
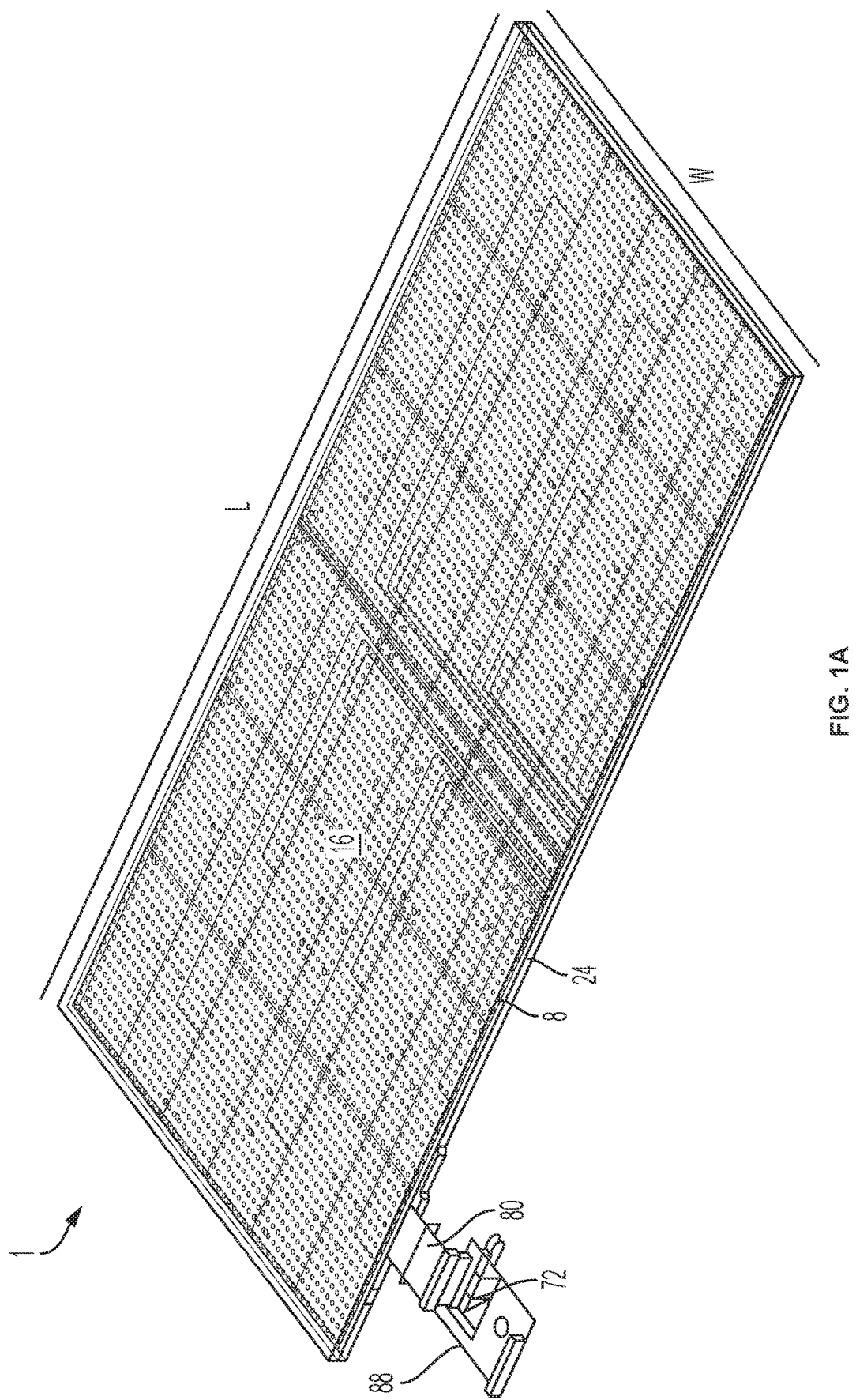
FIG. 1A illustrates a perspective view of a presence detection system according to an example embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"Occupying object" herein refers to any object being supported on the support layer 8 and contacting the top surface 16 of the support layer 8. It will be understood that the occupying object may be a non-living object. The occupying object may also be a living object, such as human or an animal. The occupying object may also be a non-human object (non-living object or animal). The occupying object may also be a portion of an object (ex: a wheel of a cart, one foot of a person, a shoe sole of a person). Accordingly, a complete object being supported on the support layer may appear as multiple occupying objects.

Referring now to FIGS. 1A to 1E, therein illustrated is a perspective view, an exploded view, a top plan view, section view along the line B-B and close-up of the section view, respectively of a presence detection system 1 according to an example embodiment. The presence detection system 1 includes a support layer 8 that is operable to act as an underlying surface for supporting one or more occupying objects. The presence detection system 1 is operable to detect the presence of occupying objects being supported on a top most surface 16. The support layer 8 can define a presence detection area that is effective for detecting the presence of occupying objects located on the presence detection area. According to various example embodiments described herein, the support layer 8 can include a plurality of sub-layers.

The presence detection system 1 further includes a sensor layer 24 that is disposed beneath the support layer 8. The sensor layer 24 is operable to output presence readings indicating the presence of one or more occupying objects being supported on the support layer 8.

The sensor layer 24 may include a plurality of sensors 32 arranged in an array to cover an area corresponding to the presence detection area. Each sensor is located under a corresponding sub-area of the support layer 8 and the reading outputted by any sensor is indicative of whether an occupying object is present over a sub-area of the support layer 8 corresponding to that sensor 32.

According to various example embodiments, the sensors 32 of the sensor layer 24 is a plurality of photosensors. Each photosensor 32 outputs a sensor reading that differs based on a level of light being received by that photosensor 32. In particular, when an object is not present on a sub-area of the support layer 8 for a given photosensor 32, a sensor reading having a first value is outputted. An occupying object being present on the sub-area of the support layer 8 for the given photosensor 32 obstructs light flowing through that sub-area to that photosensor 32 and a sensor reading having a second value that is different from the first value is outputted. The reading outputted by the photosensor 32 can have a variable (i.e. non-binary) level depending on the actual level of light flowing to it, and a threshold value can be defined to distinguish between an outputted level indicating presence of an occupying object versus non-presence of an occupying object.

Figure 1B:
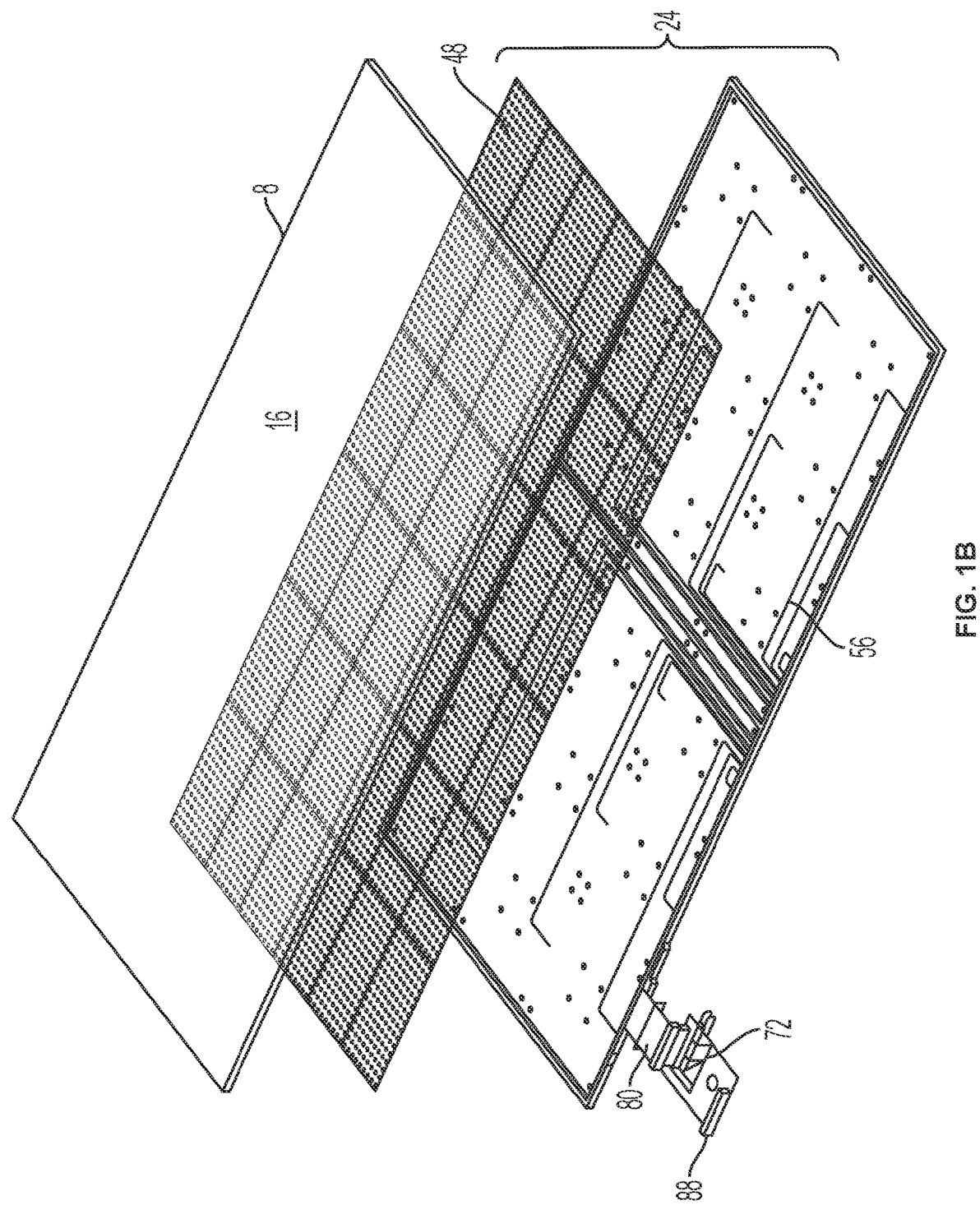
FIG. 1B illustrates an exploded view of a presence detection system according to an example embodiment.
Figure 1C:
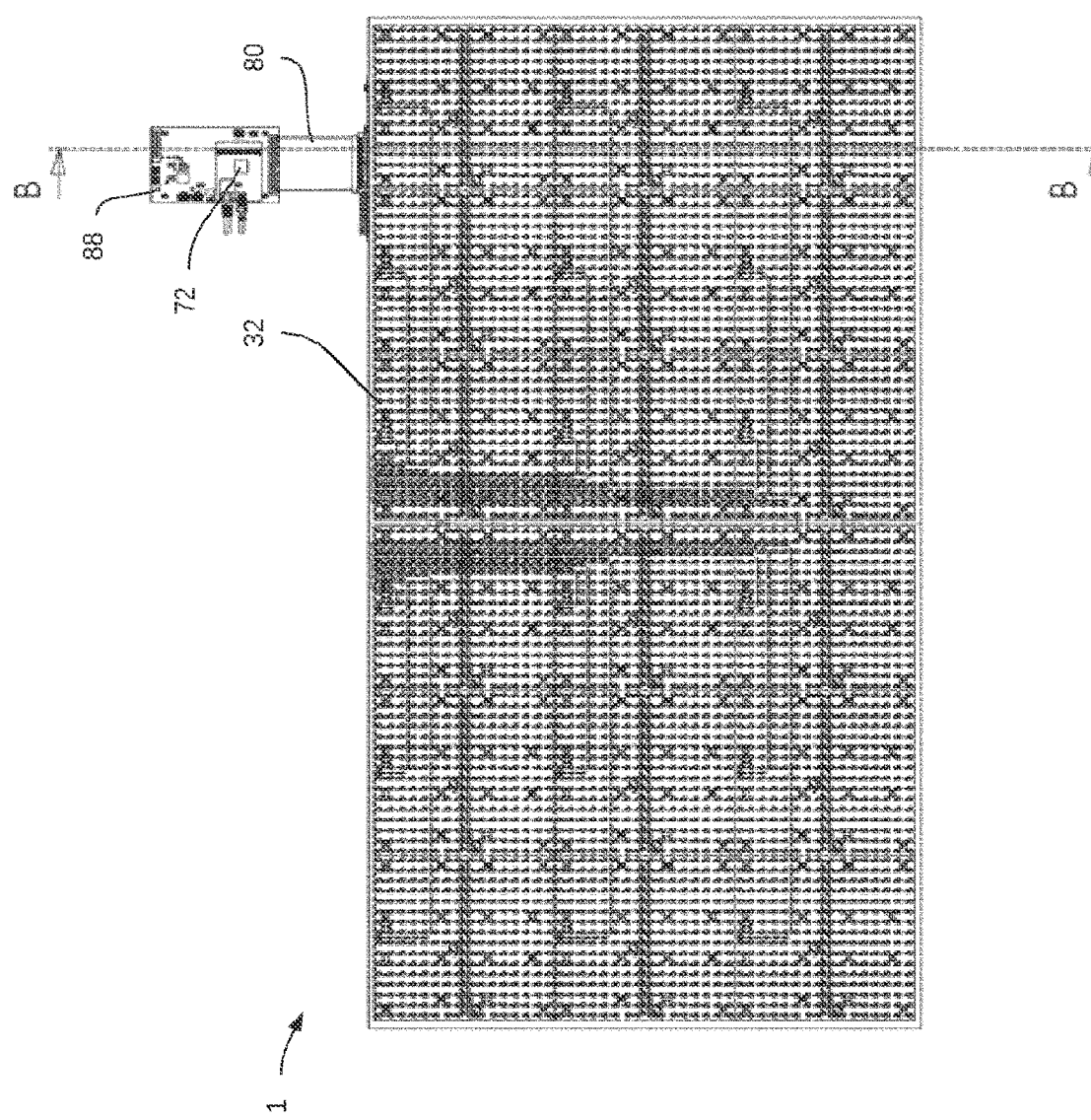
FIG. 1C illustrates a top plan view of the presence detection system according to the example embodiment.
Figure 1D:
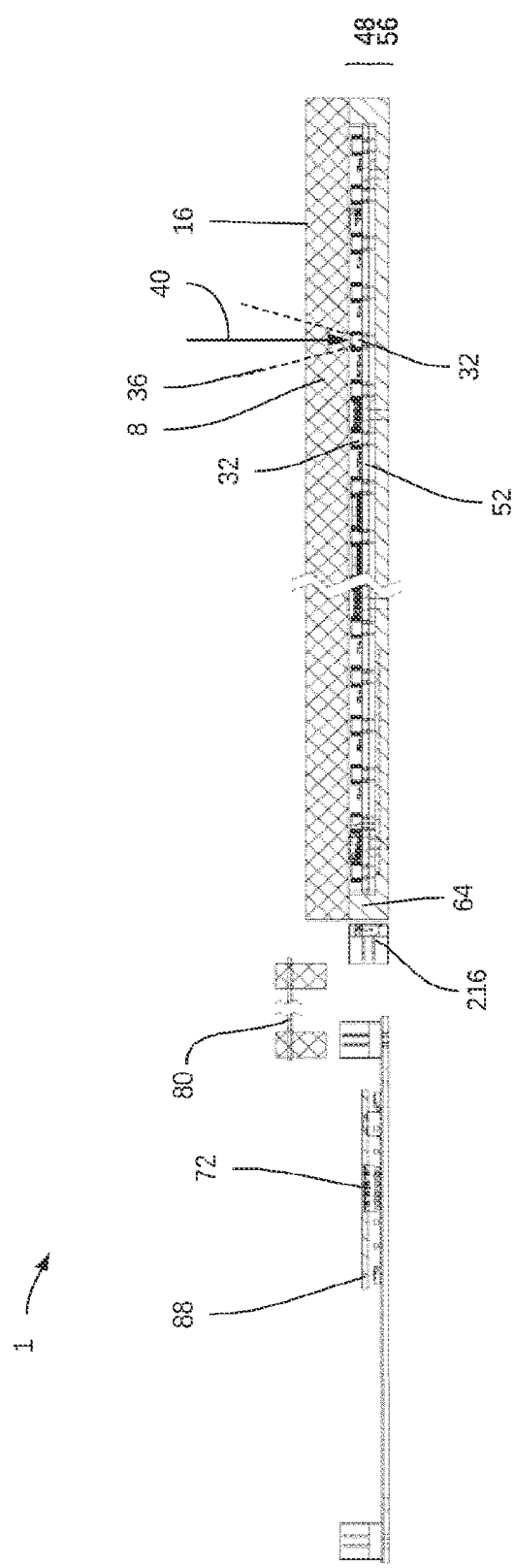
FIG. 1D illustrates a section view along the line B-B of the presence detection system according to the example embodiment.
Figure 1E:
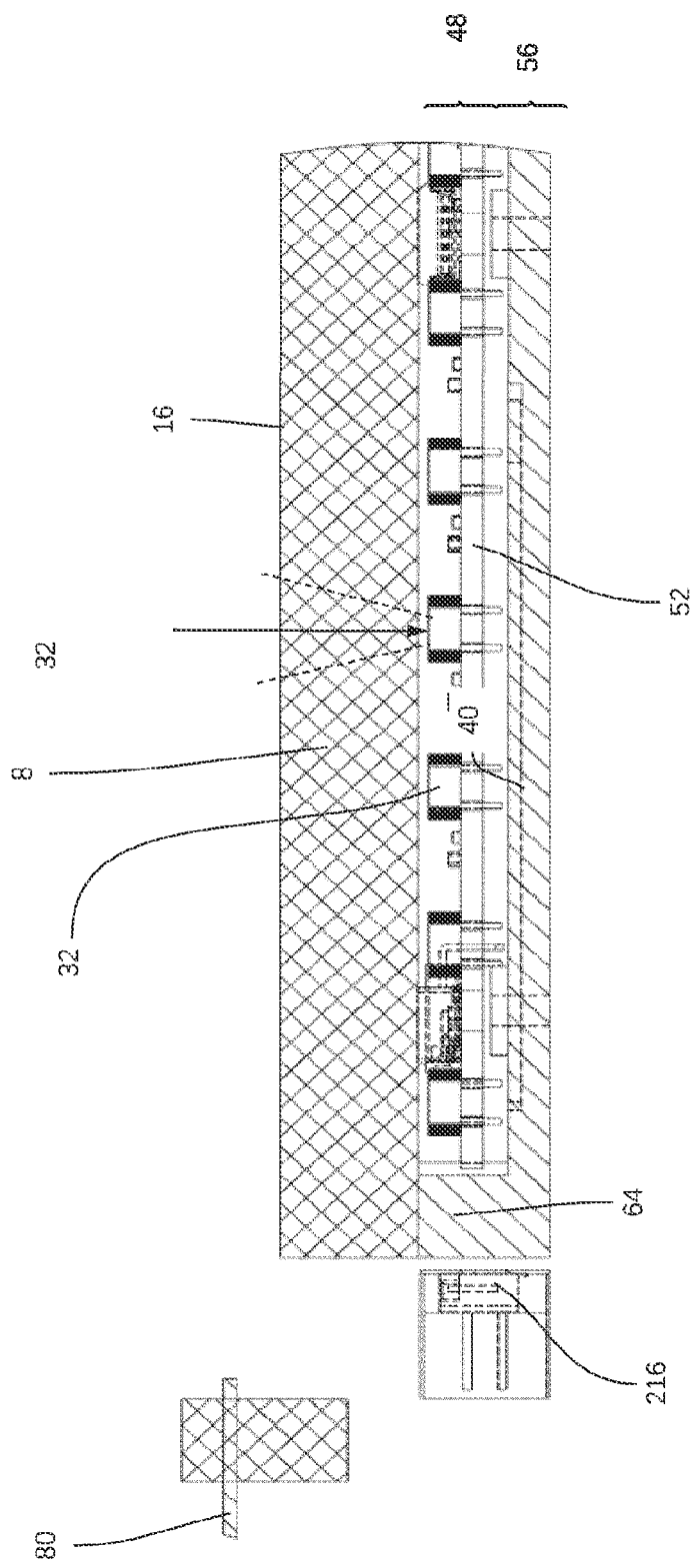
FIG. 1E illustrates a close-up of the section view of FIG. 1D.

According to an example embodiment, and as illustrated in FIGS. 1D and 1E, the photosensors 32 are oriented to define a detection cone 36 that is oriented generally transversely to the sensor layer 24. Light flowing through the detection cone 36 and incident upon a photosensor is detected by that photosensor. In FIGS. 1D and 1E, this detection cone is generally defined by a space 36 surrounding vector 40. The detection cone 36 further defines the sub-area of the support layer 8 being captured by the photosensor 32 associated to that cone 36.

The photosensor 32 may be any one a photoresistor, a phototransistor, a photodiode, a photovoltaic sensor, an infra-red sensor or any other sensor that is responsive to light levels known in the art.

The FIGS. 1A and 1B show sensors 32 being located across the full detection area of the support layer 8 for illustrative purposes. It will be appreciated that in the fully assembled presence detection system 1, the placement of the sensors 32 extends to cover substantially the full area underneath the support layer 8, such as over the entire length L and width W of the support layer 8.

According to an example embodiment, and as illustrated in FIGS. 1B, 1D and 1E, the sensor layer 24 can include a first sublayer 48 that supports the sensors 32. For example, the first sublayer 48 includes the substrate 52 to which the sensors 32 are connected. A printed circuit interconnecting the sensors 32 and other electronic components can also be drawn on the substrate 52 of the first sublayer 48. According to various example embodiments, and as described elsewhere herein, the first sublayer 48 can be formed of a plurality of circuit boards that are arranged in an array under the support layer 8. Each printed circuit board has connected to it a respective subset of the sensors 32. The aggregate of the printed circuit boards forms the whole first sublayer 48 of the sensor layer 24 and the sensors 32 are located at the top of this aggregate surface. The first sublayer 48 can be substantially planar. The first sublayer 48 can have substantially the same length L and width W as the support layer 8.

The sensor layer 24 can further include a second sublayer 56 disposed beneath and supporting the first sublayer 48. The second sublayer 56 can be formed of a material that provides electromagnetic shielding to the electrical components connected to the first sublayer 48. For example, the second sublayer 56 can be formed of an anti-static material. As best seen in FIG. 1E, edges of the second sublayer 56 can have an upstanding lip 64 to provide further shielding to the first sublayer. The second sublayer 56 can also have substantially the same length L and width W as the support layer 8.

A plurality of electrical connections can be provided on the second sublayer 56 to interconnect components of the first sublayer 48. In particular, where the first sublayer 48 is provided as a plurality of printed circuit boards each having a respective subset of the sensors 32, the electrical connections of the second sublayer 56 can interconnect these printed circuit boards.

The presence detection system 1 is configured to be placed to act as an underlying surface for use by human users. Accordingly, in its intended use, human users will step onto the top surface 16 of the support layer 8. The presence detection system 1 can be placed atop a floor surface, in which case, the top surface 16 will be slightly raised over the floor surface. Alternatively, the presence detection system 1 will be installed into the flooring or ground. The top surface 16 may be flush with (ex: at substantially the same height) as the floor surface surrounding the presence detection system 1.

The support layer 8 of the presence detection system 1 may be translucent. This property of the support layer 8 allows at least some light to pass from the top surface 16 through the support layer 8 to the sensor layer 24 disposed below the support layer 8. Accordingly, changing light conditions due to obscuring of light from objects located on the top surface 16 can be detected by the sensor layer 24.

Although the support layer 8 is translucent, it may also block sufficient light to obscure the sensor layer 24 when viewed by a human user stepping near or onto the support layer 8. The support layer 8 reducing the visibility of the sensor layer 24 though the top surface 16 can reduce the feeling of invasiveness for users stepping onto the support layer 8.

The support layer 8 can include one or more sub-layers formed of translucent film to reduce visibility. The translucent film can be a top sub-layer of the support layer 8. Alternatively, the translucent film can be a bottom sub-layer of the support layer 8 (i.e. immediately above the first sublayer 48).

The top surface 16 may be an anti-slip surface to allow a user to step onto (and walk across) the support layer 8 without slipping. The top surface 16 can be formed of a film sub-layer providing the anti-slip surface. The anti-slip film can be translucent or transparent to permit passage of light therethrough.

In other embodiments, the support layer 8 can be formed of a clear, translucent or transparent glass material that provides sufficient support for occupying objects while permitting passage of light therethrough. In other example embodiments, the support layer 8 can be formed of a tinted glass material that is translucent. The support layer 8 can also be formed of a glass material having an anti-slip top surface 16.

Continuing with FIGS. 1A to 1E, the presence detection system 1 further includes a controller 72 that is configured for receiving the presence readings from the sensor layer 24 and for determining, based on the readings, an indicator of the occupancy status of the support layer 8.

The occupancy status of the support layer 8 refers to one or more characteristics of how occupying objects are currently occupying the support layer 8 (i.e. being supported on the top surface 16 of the support layer 8). The indicator of the occupancy status can be a number of human feet being supported on the support layer 8, which can be further indicative of the number of persons present on the support layer 8. Alternatively, or additionally, the indicator of the occupancy status can be an occupancy level of the area of the support layer 8. This occupancy level can indicate how much of the area is currently occupied and how much area is available for occupation by other objects. The occupancy level may indicate a percentage of the presence detection area that is current occupied by a person. Methods for determining the indicator of occupancy status, which may be implemented by the controller 72, are described elsewhere herein.

The controller 72 of the presence detection system 1 described herein may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

A method, which may be implemented by the controller 72, for detecting presence of one or more objects supported on a support layer (ex: support layer 8) is detected using a sensor layer (ex: sensor layer 24) disposed beneath the support layer and, based on readings outputted from the sensor layer, an indicator of an occupancy status of the support layer by objects being supported on the support layer is determined. As described elsewhere herein, the indicator of the occupancy status can be a number of human feet being supported on the support layer, which can be further indicative of the number of persons present on the support layer. Alternatively, or additionally, the indicator of the occupancy status can be an occupancy level of the area of the support layer. This occupancy level can indicate how much of the area is currently occupied and how much area is available for occupation by other objects. The occupancy level may indicate a percentage of the presence detection area that is current occupied by a person.

In the example illustrated in FIGS. 1A to 1E, the controller 72 is connected to the sensor layer 24 via a cable 80. Furthermore, in the illustrated example, the controller 72 is located in proximity of the sensor layer 24. However, it will be understood that the controller 72 can be located remotely of the sensor layer 24 in various example embodiments and may be connected to the sensor layer 24 over a wired or a wireless connection. The controller 72 receives the presence readings outputted by the sensor layer 24 over the sensor-to-controller connection.

As further illustrated in the example of FIGS. 1A to 1D, the controller 72 is embedded on a control board 88 that is connected to the cable 80. One or more interfacing components can be implemented on the control board 88, such as a multiplexer, communication protocol interface device and/ or an analog-to-digital converters. These interfacing components operate to receive and convert the presence readings from the sensor 32 to a format (ex: digital signals) suitable for processing by the controller 72 to determine the indicator of occupancy status of the support layer 8.

In some example embodiments, one or more of the interface components can be implemented internally within the controller 72. For example, the communication protocol interface device and the analog-to-digital converter can be built into the controller 72.

In some example embodiments, the processing of presence readings from the sensor layer 24 to determine the indicator of the occupancy status can be split between the controller 72 and one or more other processors. For example, an initial set of processing steps is initially carried out at the controller 72 (ex: to provide an initial indicator) and further processing is carried out at the other processors, which may require more computational power, to determine a more detailed and/or more accurate indicator of the occupancy status. Accordingly, the controller 72 can include a communication module for transmitting information (ex: the indicator of occupancy status) to another device or processor for further processing.

Figure 2A:
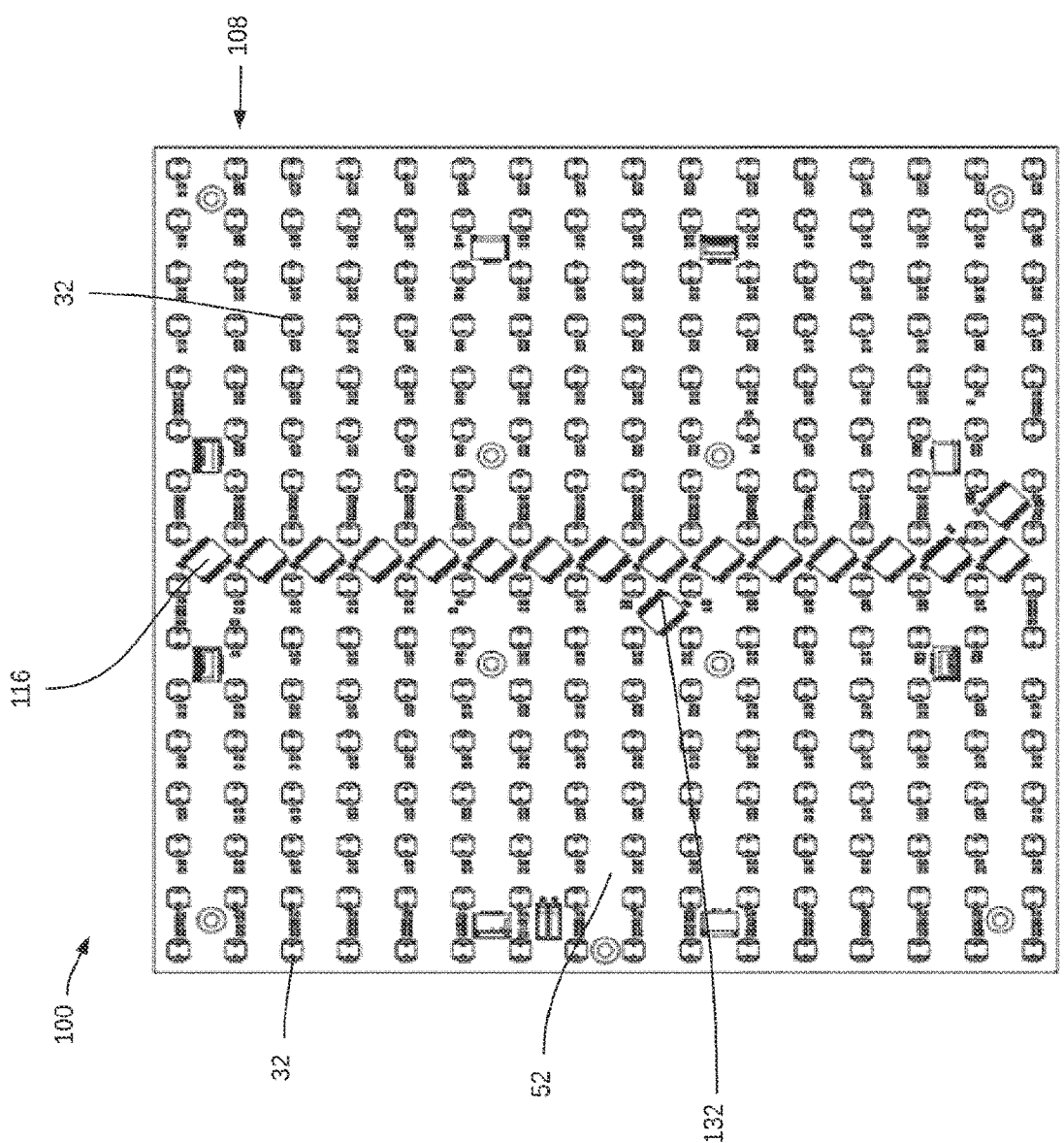
FIG. 2A illustrates a plan view of a sensor board according to an example embodiment.

Referring now to FIG. 2A, therein illustrated is a plan view of a sensor board 100 according to an example embodiment. The sensor board 100 corresponds to one of the circuit boards described hereinabove that can be arranged in an array to form the first sublayer 48 of the presence detection system 1.

The sensors 32 are distributed over a top surface of the sensor board 100. As illustrated, the sensors 32 may be equally spaced apart over the entire area of the top surface of the sensor board 100. As further illustrated, the sensors 32 are arranged in an array over the top surface of the sensor board 100. As described elsewhere herein, the sensors 32, which may be photosensors, are oriented upwardly to measure light level incident in a direction generally transverse to the sensor board 100 (ex: light flowing through the detection cone 36 of each sensor 32). Accordingly, each sensor 32 is configured to detect an occupying object located in a space immediately above that sensor 32 and to output a presence reading indicating the incident light level, which is further indicative of the presence of the object.

A first set of at least one multiplexer is connected to the plurality of sensors 32 of the sensor board 100 to receive the presence readings therefrom. The first set of at least one multiplexer further outputs a board-level combined presence reading signal that includes all of the presence readings generated by the sensors 32.

The first set of multiplexers can include a first subset of multiplexers 116 that are each connected to a respective row 108 of sensors 32 of the array of sensors of the sensor board 100. In the illustrated example, the array of sensors 32 is arranged in 16 rows 108 of sensors 32 with each row 108 having 16 sensors 32 such that a total of 256 sensors 32 are provided on the sensor board 100. Each row 108 of sensors 32 further has a respective row-level multiplexer 116 that receives the presence readings from that row 108 of sensors 32. Accordingly, 16 row-level multiplexers 116 are provided on the sensor board 100. Each row-level multiplexer 116 further combines the received presence readings and outputs a row-level combined presence reading signal.

Figure 2B:
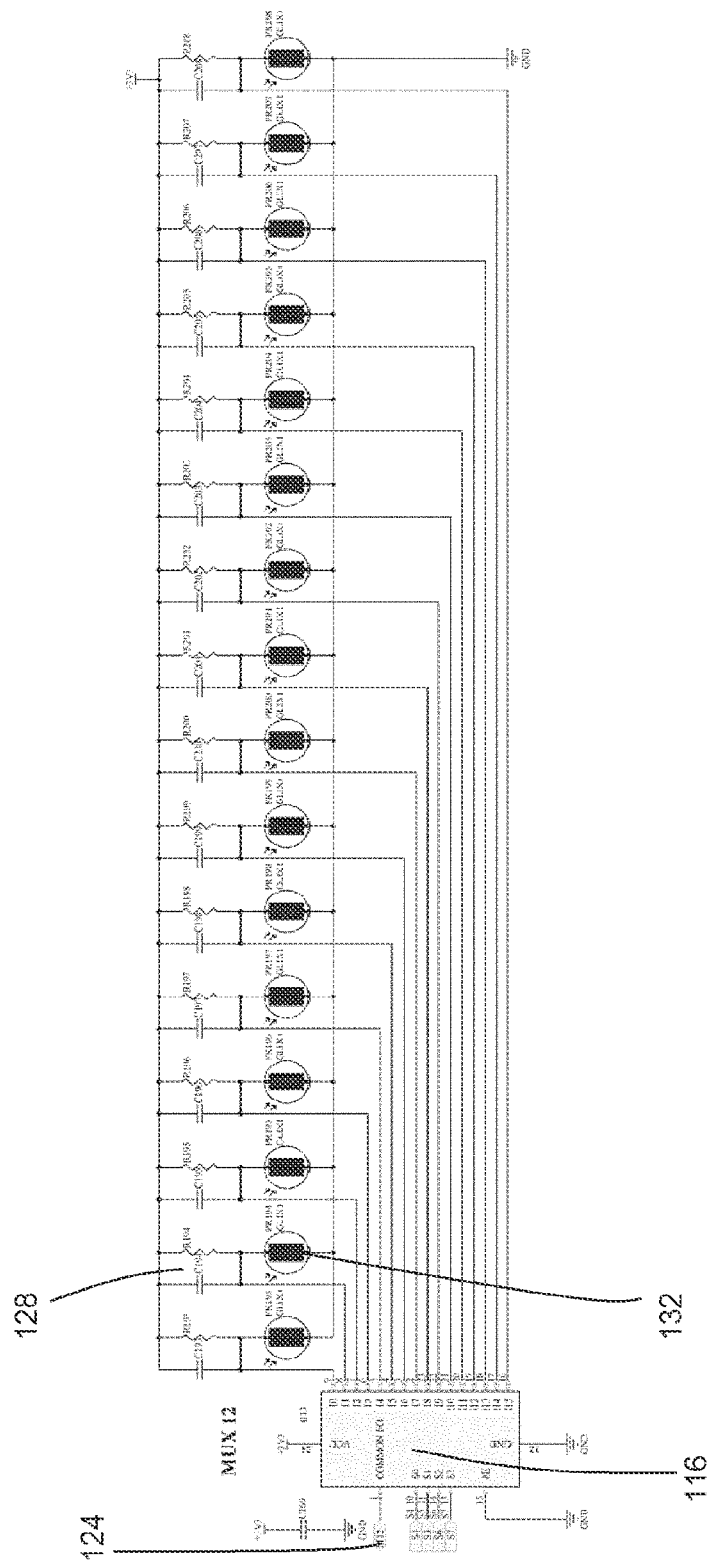
FIG. 2B illustrates a schematic circuit diagram of the electrical connections and components of one row of sensors according to an example embodiment.

Referring now to FIG. 2B, therein illustrated is a schematic circuit diagram of the electrical connections and components of one row of sensors 32 of the sensor board 100 according to an example embodiment. Each sensor 32 is connected to an input port of the row-level multiplexer 116. The row-level multiplexer 116 outputs the row-level combined presence reading signal 124 that includes all of the presence readings of the given row of sensors 32. According to one example embodiment, and as illustrated, each sensor 32 is connected to the row-level multiplexer 116 via a respective resistor-capacitor (RC) circuit 128. The RC circuit 128 acts as a low-pass filter to filter spurious high-frequency components of the presence readings outputted by the sensor 32.

Referring back to FIG. 2A, the sensor board 100 further includes a board-level multiplexer 132 that receives the row-level combined presence readings from all of the row-level multiplexers 116 of the sensor board and outputs a board-level combined presence reading signal. It will be appreciated that this board-level combined presence reading signal includes the presence readings of all of the sensors 32 of the sensor board 100 and is outputted over a single serial connection.

Figure 2C:
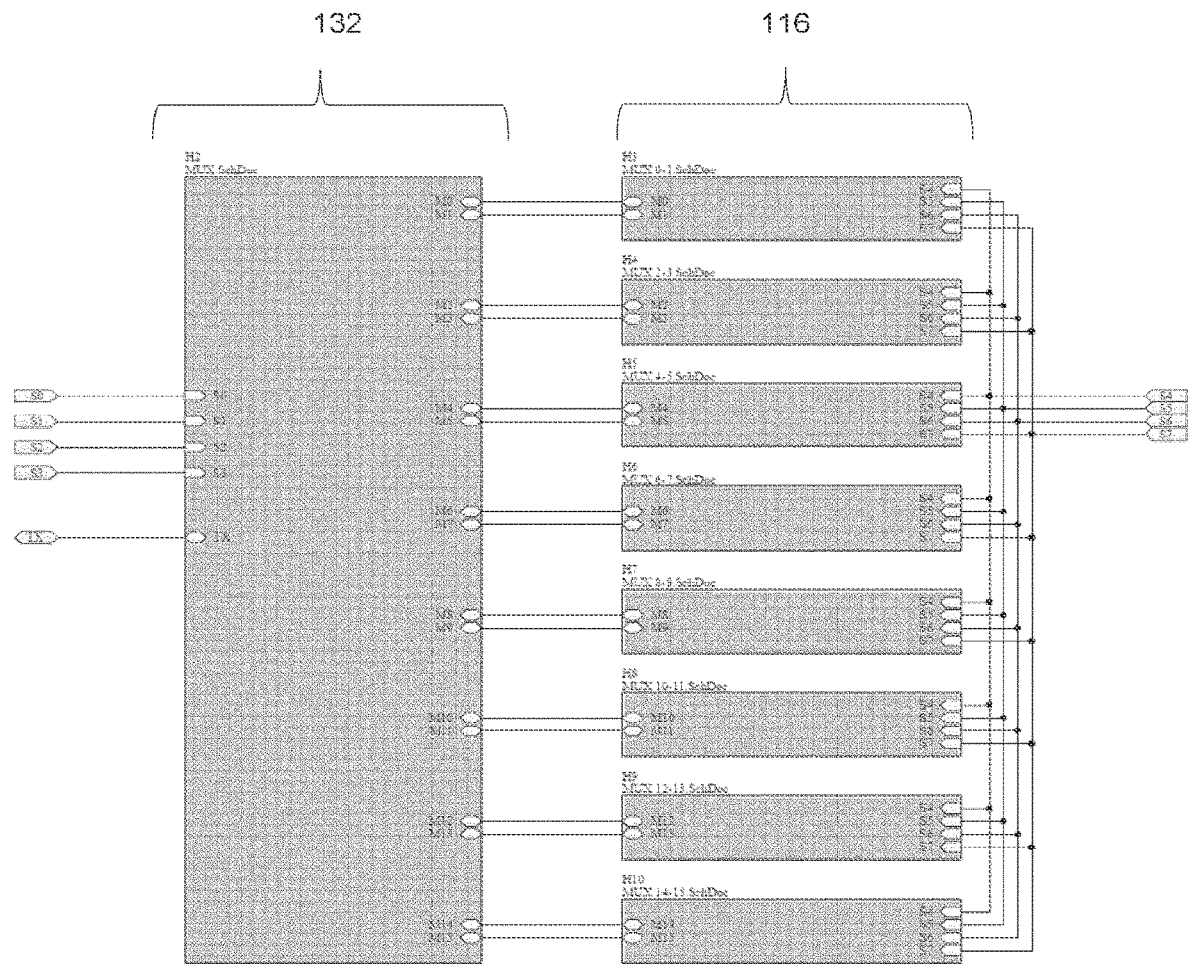
FIG. 2C illustrates a schematic circuit diagram of the board-level multiplexer and row-level multiplexers according to an example embodiment.

Referring now to FIG. 2C, therein illustrated is a schematic circuit diagram of the board-level multiplexer 132 and the row-level multiplexers 116 according to an example embodiment. Pairs of row-level multiplexers 116 are illustrated as single units in the example of FIG. 2C.

Figure 3A:
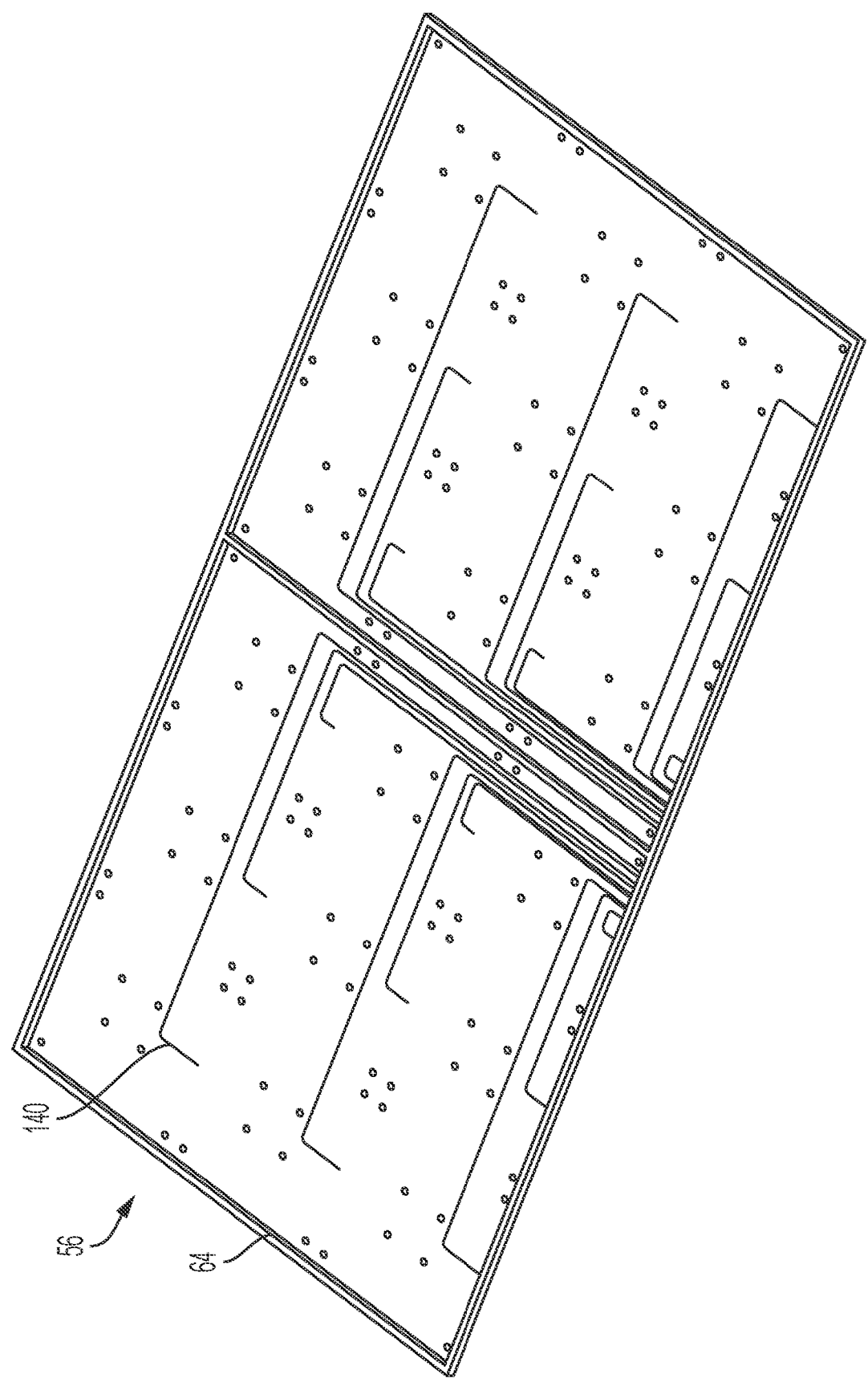
FIG. 3A illustrates a perspective view of a second substrate adapted to receive and interconnect a plurality of sensor boards according to an example embodiment.

Referring now to FIG. 3A, therein illustrated is perspective view of a substrate 56 that is adapted to receive and interconnect a plurality of sensor boards 100 according to an example embodiment. It will be appreciated that the substrate 56 corresponds to the second sublayer 56 of the sensor layer 24. As described elsewhere herein, the second substrate can be formed of a material that provides electromagnetic shielding to the electrical components connected to the first sublayer 48.

A plurality of electrical paths 140 are provided on the substrate 56. Each path ends at a location corresponding to a respective sensor board 100 of the array of sensor boards 100 forming the first substrate 48 and is adapted to connect to a respective sensor board 100. More particularly, the board-level combined presence reading signal outputted by a board-level multiplexer 132 of each sensor board can be transmitted over a respective one of the electrical paths 140.

The board-level combined presence reading signals outputted by the board-level multiplexers 132 of the sensor boards 100 are transmitted over the electrical paths 140 and received at a second set of at least one multiplexer. This second set may only have one multiplexer that receives all of the board-level combined presence reading signals, combines these signals and outputs a system-level combined presence reading signal. It will be appreciated that this system-level combined presence reading signal includes the presence reading from all of the sensors 32 of the presence detection system 1.

As illustrated in FIG. 3A, all of the electrical paths 140 lead from the position of their respective sensor boards 100 to a single region on a side of the substrate 56 where these paths can be connected to the second set of at least one multiplexer. This second set can consist of a single multiplexer (where the width of the multiplexer is sufficiently wide to receive all of the board-level combined presence reading signals). Alternatively, the second set can be formed of cascaded multiplexers, as required).

In the example illustrated in FIG. 3A, the second substrate 56 includes a lip 64 extending along the edges of the substrate 56.

Figure 3B:
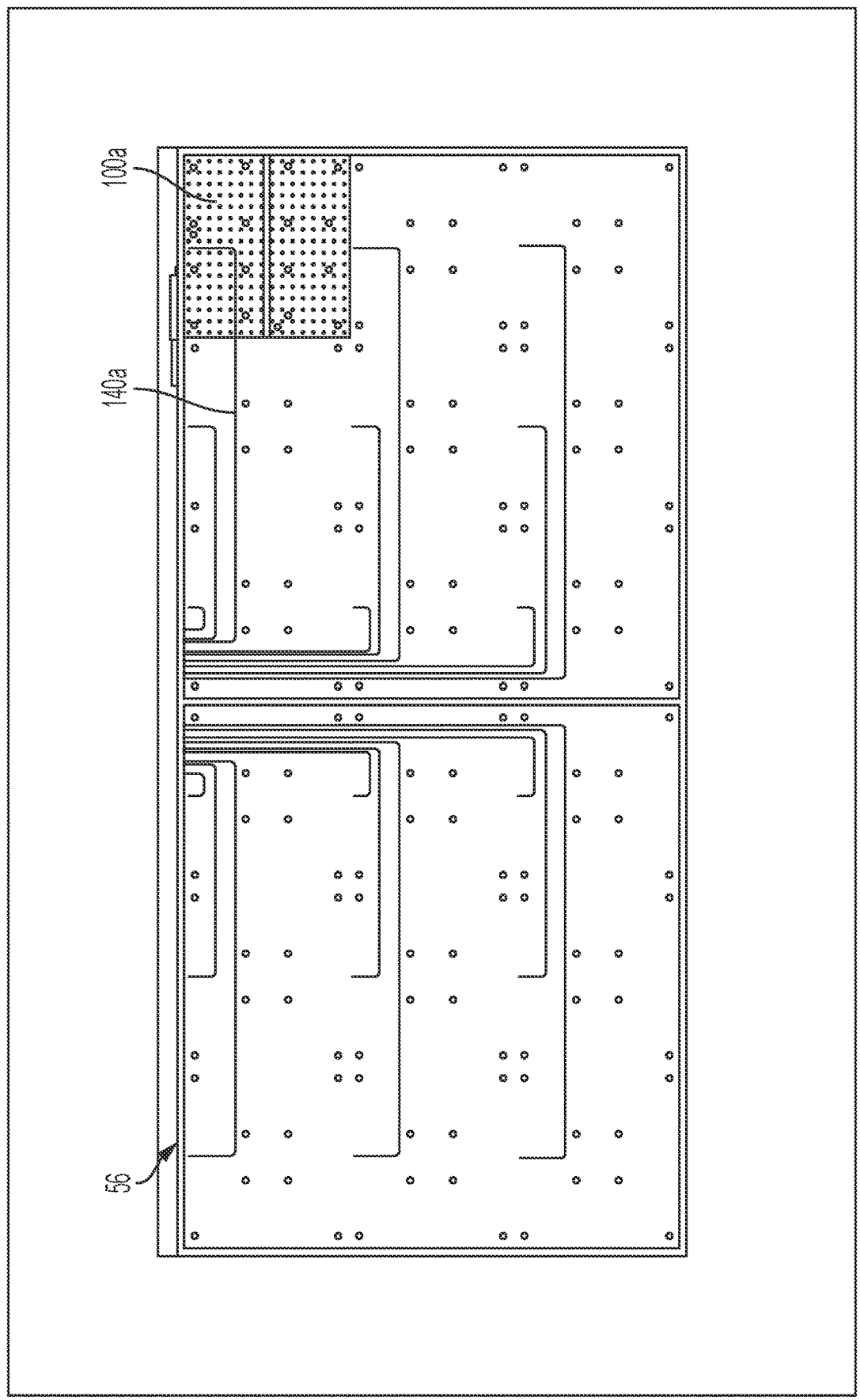
FIG. 3B illustrates a plan view of the substrate according to an example embodiment.

Referring now to FIG. 3B, therein illustrated is a plan view of the substrate 56 having received one sensor board 100a. An electrical path 140a connects the sensor board 100a to the second set of multiplexers.

Figure 3C:
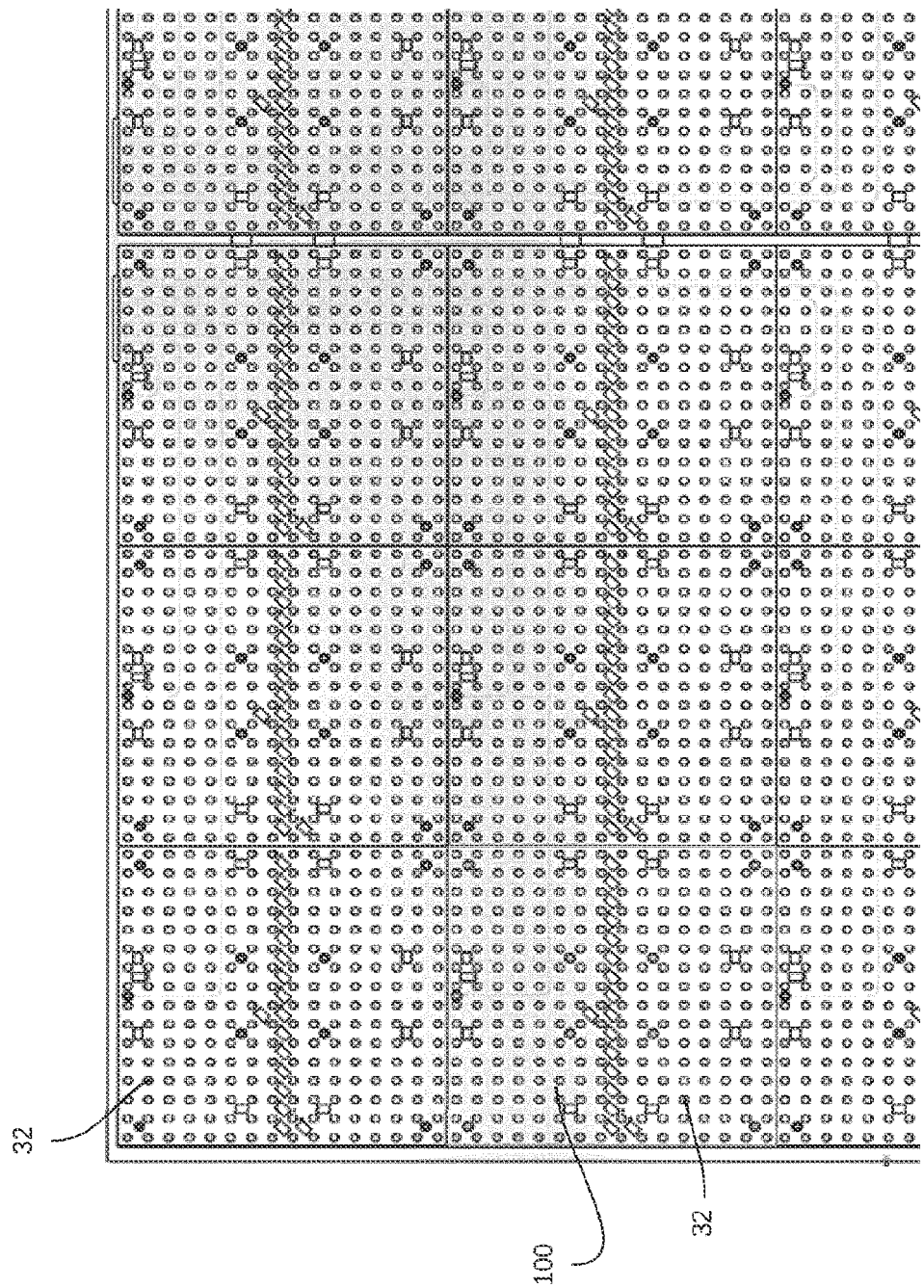
FIG. 3C illustrates a portion of a fully assembled first substrate formed of an array of sensor boards according to an example embodiment.

FIG. 3C illustrates a portion of a fully assembled first substrate 48 formed of an array of sensor boards 100.

Figure 3D:
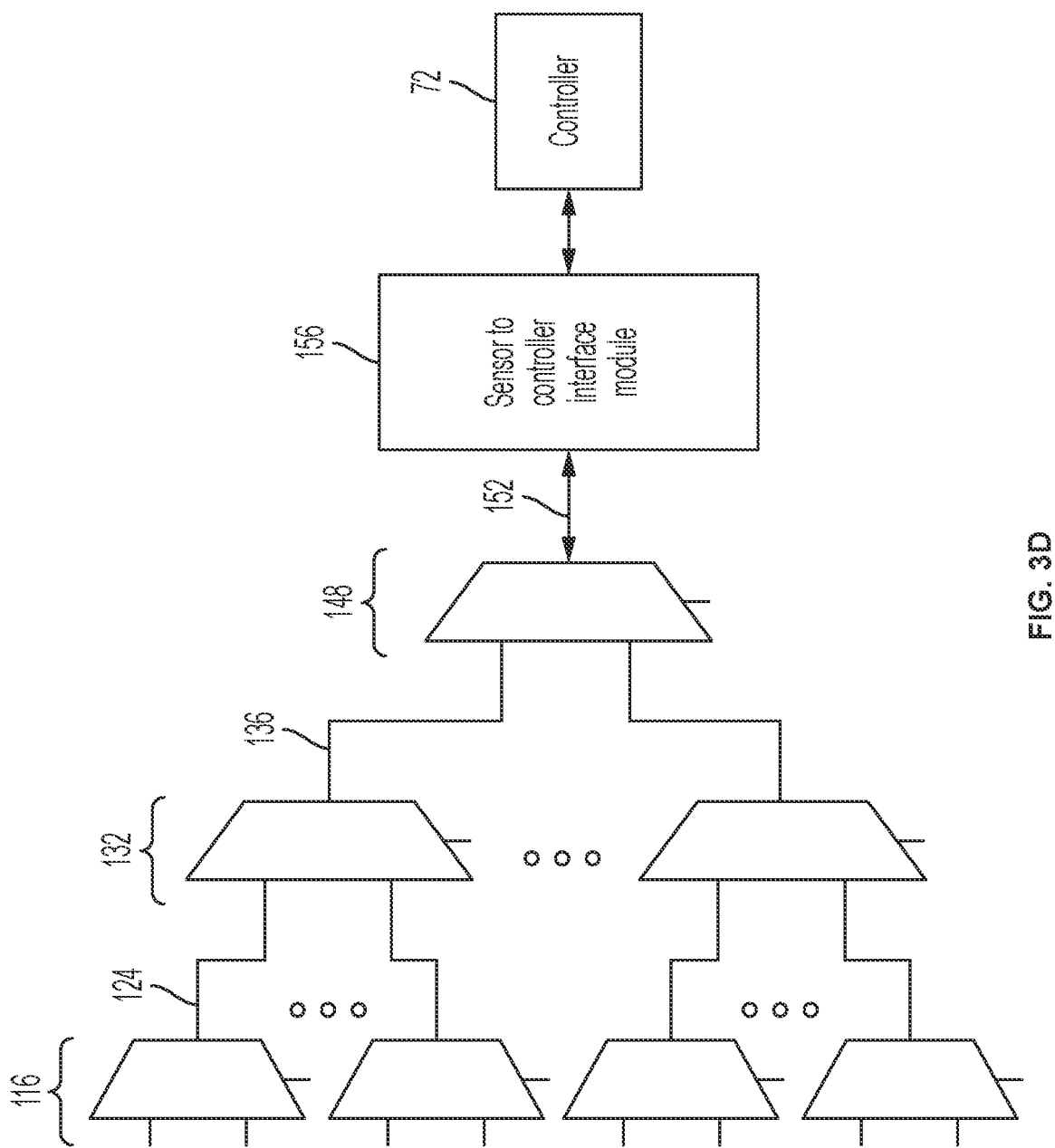
FIG. 3D illustrates a schematic circuit diagram showing the cascade of multiplexers of a presence detection system according to an example embodiment.

FIG. 3D illustrates a schematic circuit diagram showing the cascade of the multiplexers of the presence detection system 1 according to an example embodiment. Row level multiplexers 116 receive presence readings directly from sensors 32 and each outputs a row-level combined presence reading signal 124. Board-level multiplexers 132 receive the row-level combined presence reading signals 124 and each outputs a board-level combined presence reading signal 136. The row-level multiplexers 116 and board-level multiplexers 132 form the first set of multiplexers. The system-level multiplexer 148 receives the board-level combined presence reading signals 136 and outputs a system-level combined presence reading signal 152, which is further received at the controller 72. A sensor to controller interface module 156 can be located between the system-level multiplexer 148 and the controller 72 to convert the system level combined presence reading signal 152 to a format suitable for processing by the controller 72.

It will be appreciated that providing sets of sensors 32 on discrete sensor boards 100 provides some modularity to the presence detection system 1. The size (length and width) of a detection area, corresponding to the area of the top surface 16 of the support layer 8, can be varied for various applications by selecting an appropriate number of sensor boards 100. For a larger detection area, a greater number of sensor boards 100 can be used. For a smaller detection area, a lesser number of sensor boards 100 can be used. The substrate 56 needs to be sized according to the detection area. Similarly, the support layer 8 needs to be sized according to the detection area. The controller 72 and the sensor to controller interface module 156 also need to be appropriately programmed depending on the number of sensors 32 and the configuration of the cascade of multiplexers. Further modularity may be achieved by using substrates 56 of predefined sizes. For example, each substrate 56 can be sized to accommodate a predefined number of sensor boards 100. Accordingly, an appropriate number of substrates 56 can be chosen based on the desired size of the detection area.

It was observed that the use of a large number of sensors 32, such as photosensors, and the combining of presence readings using a cascade of multiplexers can introduce various spurious signals that need to be taken into account and/or compensated for, when processing the presence readings. It was further observed that a balance needs to be struck between the number of sensors used, the frequency at which multiplexers are driven to update the presence readings received from the sensors, and any delays caused by components, such as RC circuits, added to compensate for spurious signals, such as high frequency signals.

It was observed that the presence reading signals without the RC circuit 128 acting as a low-pass filter exhibit significant dips that can cause a misreading of the signal (ex: interpreting a dip as the non-presence of an object when the object is still present over a sensor 32). When the RC circuit 128 is introduced, the dips are attenuated to a level that will significantly reduce the number of misinterpretations of the presence readings.

It was also observed that the addition of the RC filter increases the rise time in the change in the voltage level caused from an occupying object being present on the support layer 8 from a state where the occupying object was not previously present. The voltage level is useful for indicating the presence of the occupying object only after the rise time has been completed. Accordingly, the rise time defines a maximum effective frequency at which the multiplexers can be driven to update presence readings from the sensors 32. The updating of the presence readings allows identifying the change in presence of an occupying object over a sensor 32. It will be appreciated that driving the multiplexer at a higher frequency can result in updating the presence readings multiple times during a rise time. While some readings during the rise time may be useful to provide early indication of a change in the presence of an occupying object, driving the multiplexer at a very high frequency can result in redundant readings.

It was further observed that having a refresh frequency on the order of a tenth of second is sufficient in applications for detecting presence of human users being supported by the support layer 8 (i.e. a refresh frequency of 10 Hz or more). For example, it was observed that while a person is running, the person's foot will typically contact the ground for approximately 300 ms in each step. A refresh frequency on the order of a tenth of second allowed determining changes in the presence of human users sufficiently quickly to trigger an action in response thereto. In one example implementation, a refresh rate of approximately 20 times per second was implemented. Accordingly, components used (ex: sensors 32 and RC filters) are selected to have effective values that provide sufficient compensation to eliminate spurious signal components while providing a sufficiently high refresh frequency. In another example implementation, a refresh frequency of approximately 80 times per second or greater was implemented.

The presence detection system 1 may include a synchronization module that emits appropriate switching signals to the multiplexers (ex: 116, 132, 148) to trigger switching of which signals received at the multiplexers are outputted in the combined presence reading signals. The synchronization module can be implemented as part of the controller 72 and/or the sensor-to-controller interface module 156.

It was further observed that the presence reading signals received at the controller 72 include short duration rises and falls when the multiplexers are being switched. In one example embodiment, the time points at which the controller 72 (or the digital to analog converter) of an interface module 156 samples the presence reading signals from the sensors 32 (ex: sampling of the presence readings in the system-level combined presence reading 152) is delayed by a given time interval with respect to the time points at which the switching signals from the synchronization module trigger switching of the multiplexers. This delay should be sufficient to allow the rise/fall in the signal after a switching to stabilize before sampling the signal. It will be appreciated that the sampling rate at the controller 72 is related to the refresh frequency of each sensor 32 multiplied by the total number of sensors 32 present on the board.

It was observed that the use of multiplexers can significantly reduce the cost of the presence detection system 1 while providing a performance that is sufficient for various applications. This is especially the case given that presence reading signals must be received from a larger number of sensors. For example, the multiplexers can be used in place of FPGA circuits or the like, which can be significantly more costly when a larger quantity is required.

Figure 3E:
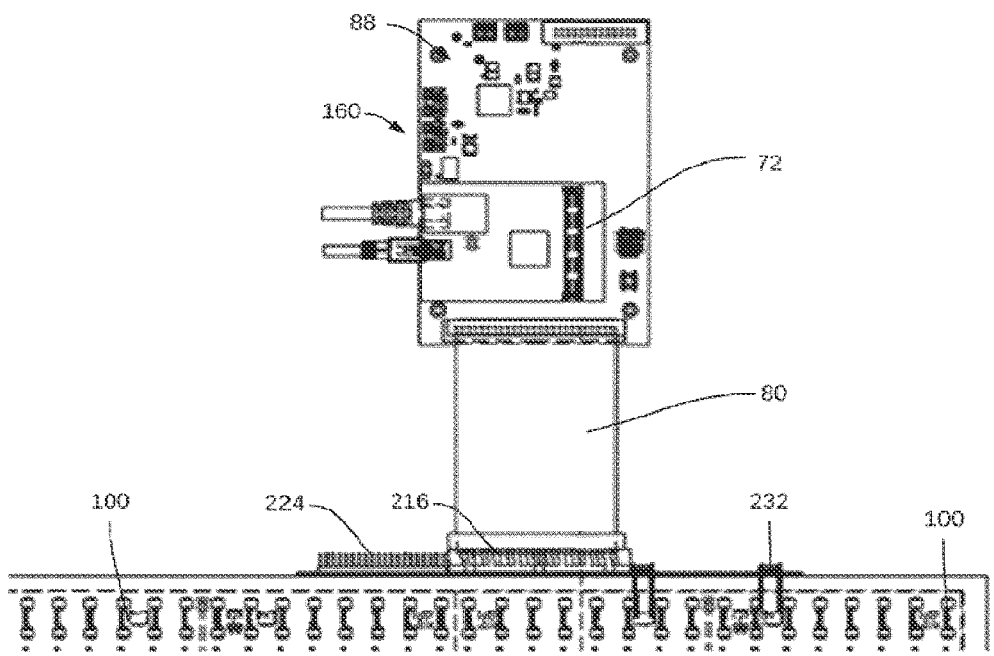
FIG. 3E illustrates a plan view of a control board according to an example embodiment.

Referring now to FIG. 3E, therein illustrated is a plan view of a control board 88 according to an example embodiment. The board-level combined presence reading signals are received over the parallel bus cable 80 at the control board 88. The controller 72, which may be a suitable microcontroller, receives the board-level combined presence reading signals. A built-in multiplexer of the controller 72 receives the board-level combined presence reading signals 136 and generates the system-level combined presence reading signal 152. A built in communication interface converts the presence reading signal to a format suitable for processing. In one example embodiment, the communication interface can be a CANBus interface. A communication port 160 allows the controller 72 to communicate with an external device.

Figure 4A:
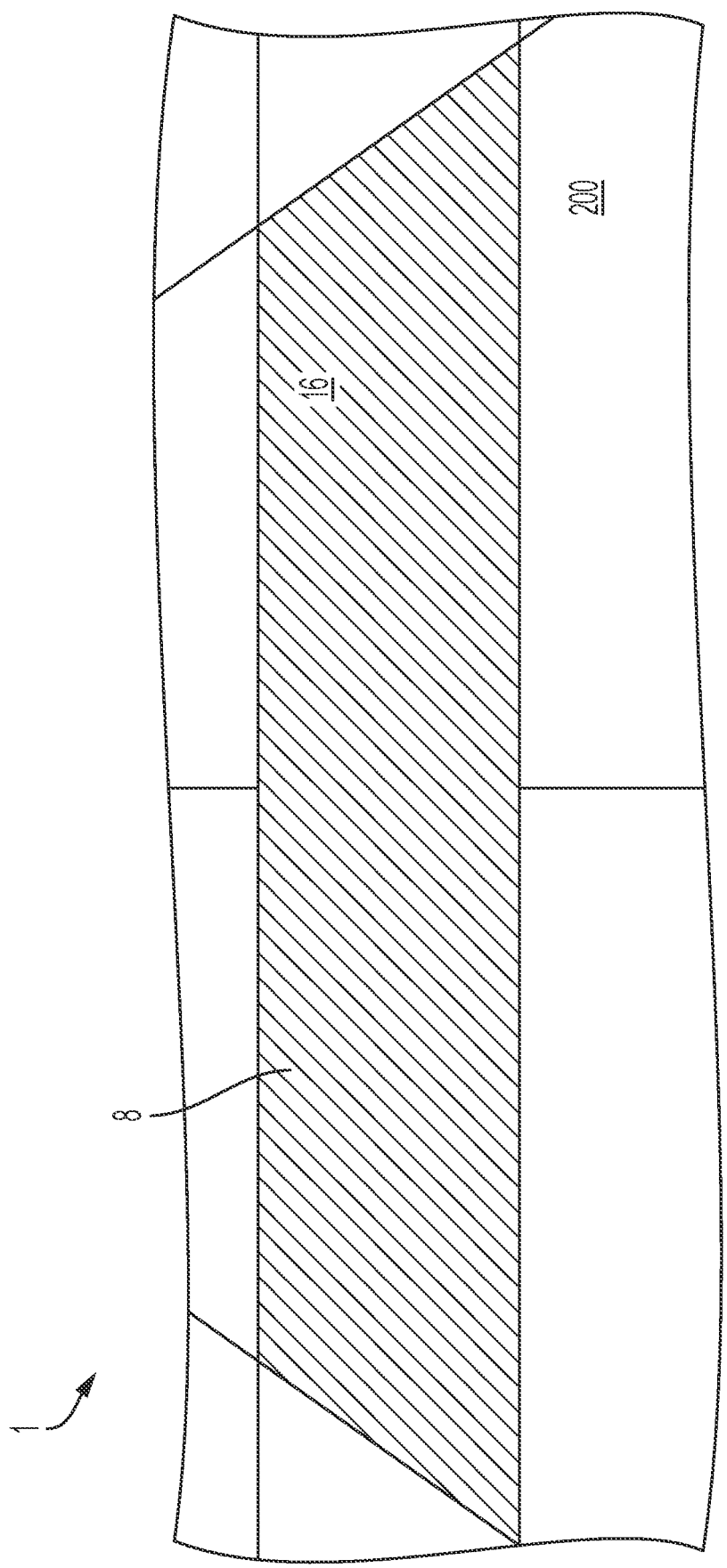
FIG. 4A illustrates a perspective view of a presence detection system having been installed in a floor according to an example embodiment.

Referring now to FIG. 4A, therein illustrated is a perspective view of a presence detection system 1 having been installed in a floor 200 according to an example embodiment. It will be appreciated that the presence detection system 1 is installed to be sunk into the floor 200 such that the top surface 16 of the support layer 8 of the presence detection system 1 is flush with the top surface of the surrounding floor 200. A human user can easily step onto the support layer 8 as if it is a continuation of the surrounding floor 200. In one example embodiment, the presence detection system 1 has a thickness (from top surface 16 to bottom of second sublayer 56) that is equivalent to the thickness of typically flooring element. The presence detection system 1 can have a thickness of approximately 20 millimeters.

Figure 4B:
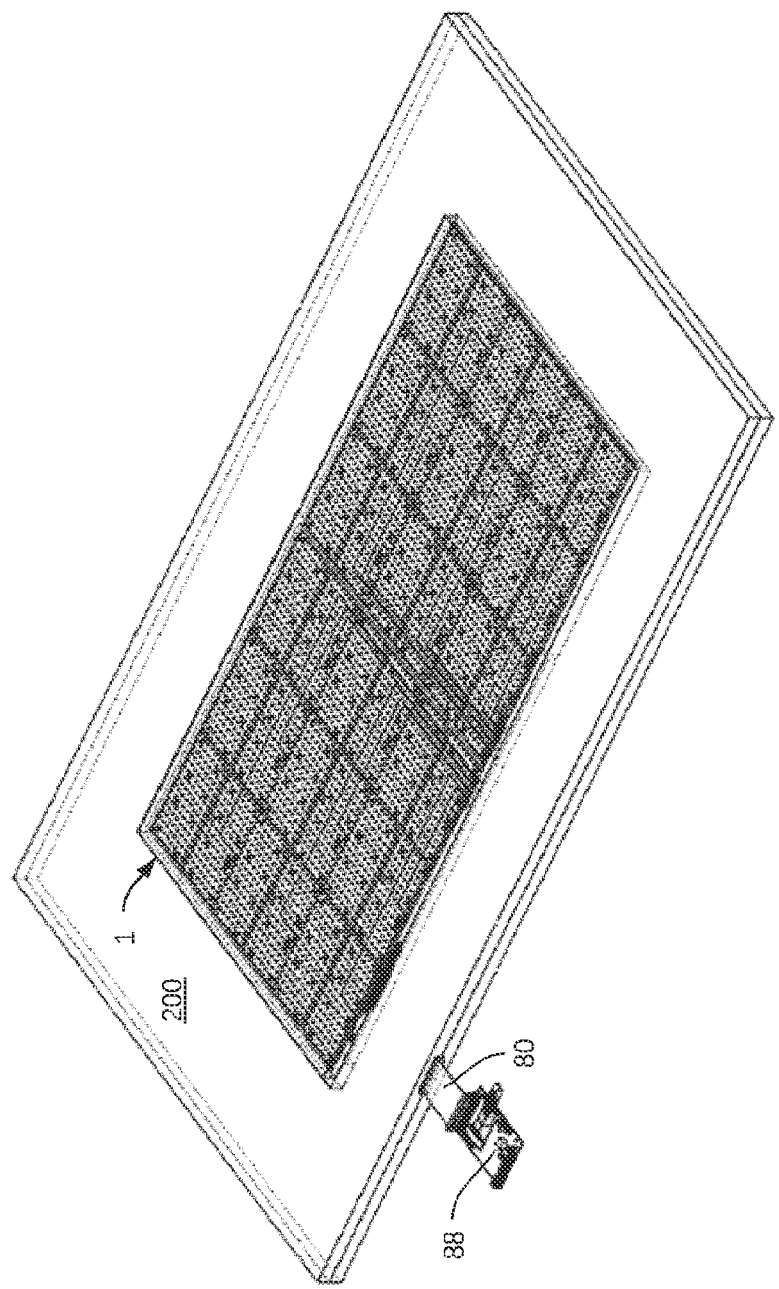
FIG. 4B is a perspective view of the presence detection system being installed in the floor according to an example embodiment.

FIG. 4B is a perspective view of the presence detection system 1 being installed in the floor 200. It will be appreciated that the sensors 32 of the sensor layer 24 are distributed across the detection area of the presence detection system 1.

Figure 4C:
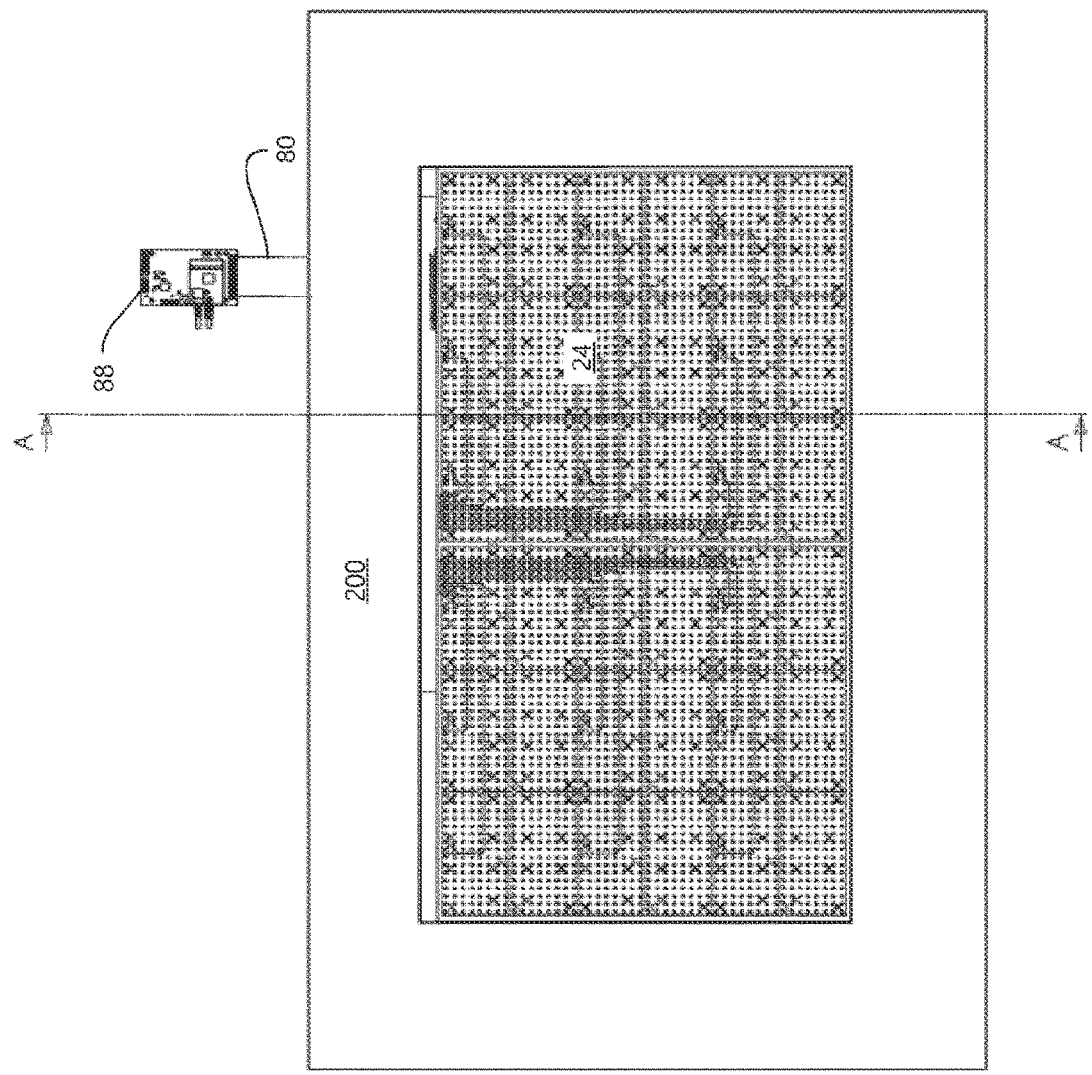
FIG. 4C illustrates a plan view of the installed presence detection system having the support layer removed according to an example embodiment.

FIG. 4C illustrates a plan view of the installed presence detection system 1 having the support layer 8 removed according to an example embodiment. It will be appreciated that the sensor layer 24 extends up to the edge of the surrounding flooring so that objects on the support layer 8 can be detected across the whole of the top surface 16 of the support layer 8.

Figure 4D:
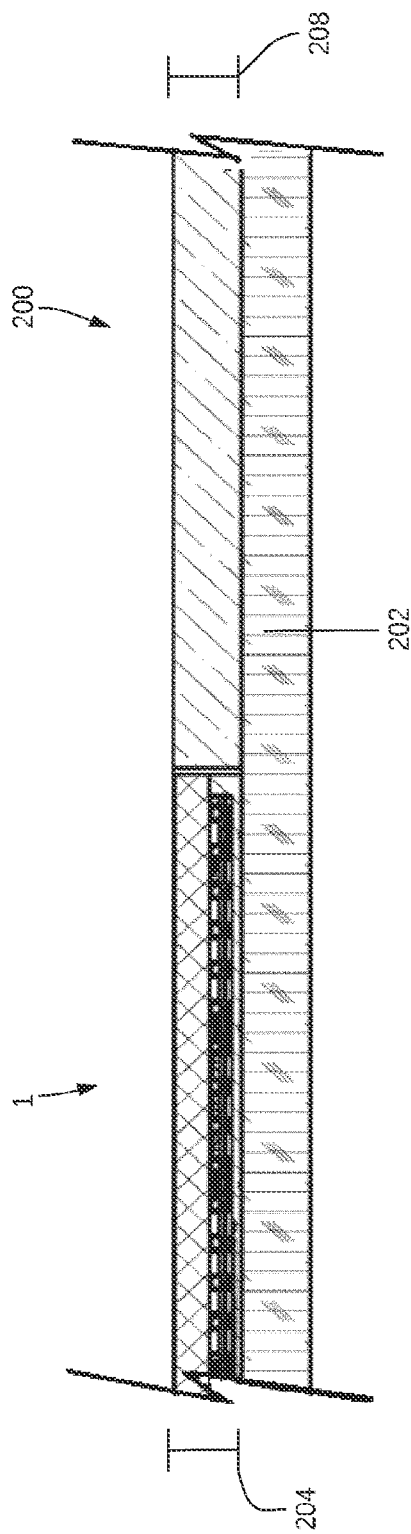
FIG. 4D illustrates a side section view of the presence detection system next to a layer of flooring according to an example embodiment.

FIG. 4D shows a side section view along the line A-A of FIG. 4C of the presence detection system 1 next to a layer of flooring 200. Both the presence detection system 1 and the flooring 200 are supported on a subfloor 202 (ex: a plywood layer). It will be appreciated that the thickness 204 of the presence detection system 1 is substantially the same as the thickness 208 of the flooring 200.

FIG. 4E is a plan view of the sensor layer 24 having an interface board 216 according to an example embodiment. The interface board 216 provides the interface between the control board 88 and the sensor layer 24. In the illustrated example, connection lines 140 connected to the sensor boards 100 of the presence detection system 1 are connected together to a pin 224 that further connects to the sensor-side interface board 216. The cable 80 connected to the controller board 88 is also connected to the interface board 216. The cable 80 can extend through an opening of the subfloor to connect to the controller 72, which may be located remotely of the sensor layer 24. The interface board 216 further includes control and/or power cables 232 used to transmit power and/or synchronization signals to the sensor boards 100.

According to one example embodiment, the controller 72 is configured to determine the indicator of occupancy status of the support layer 8 by initially determining which sensors 32 indicate the presence of an object and the location of those sensors.

Figure 5A:
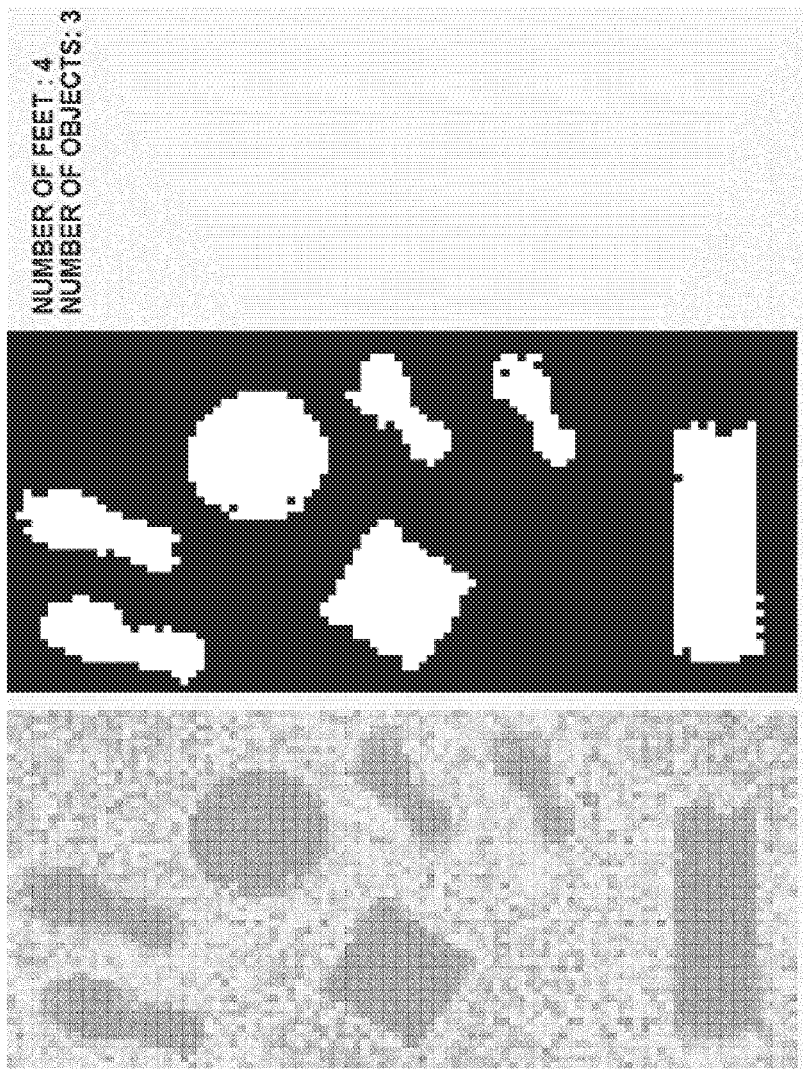
FIG. 5A illustrates a first graphical representation of presence readings received and processed by the controller according to an example embodiment.

FIG. 5A illustrates a first graphical representation (the left side representation) of presence readings received and processed by the controller 72. Each pixel of the graphical representation shows a color value that is representative of the numerical (variable) level captured by a sensor located at a corresponding location within the array of sensors 32 of the sensor layer 24.

The second graphical representation (the central representation) of FIG. 5A is a binary mask generated from the reading levels of the received presence reading signals. For example, the variable level captured by the sensors 32 are each compared against a predetermined presence threshold and reading levels exceeding the threshold are determined as indicating presence of an occupying object. Each contiguous subarea of the binary mask indicating presence of an occupying object are further determined. Subareas that are less than a predetermined size may be filtered out. Each contiguous subarea corresponds to detecting one or more groups of adjacently located sensors 32 having readings indicating the presence of an object (ex: exceeding the predetermined presence threshold).

In one example embodiment, each contiguous subarea (ex: each group of adjacently located sensors 32) can be further classified to indicate the type of occupying object present on the support layer 8 that generates the contiguous subarea (ex: the group being representative of a particular type of object, such as a human foot). The classification may be carried out based on the size and/or shape of the subarea. The detected subarea can also be compared to predetermined templates corresponding to various types of occupying objects. The types of occupying objects can be a human foot, a non-foot object, or a false positive. Occupying objects classified as a human foot may include a bare human foot or a foot wearing a shoe. Various types of shoes having different configurations of the shoe sole can be detected as corresponding to a human foot. More refined subtypes can also be determined, such as suitcase, wheelchair, animal paw, etc. Accordingly, the indicator of occupancy status determined by the controller 72 can indicate the number of occupying objects and/or the type of each occupying object. In particular, the number of human feet and the location of human feet can be outputted as part of the indicator of occupancy status. Various methods known in the art, such as applying artificial intelligence and/or machine learning, can be used to classify occupying objects. This may be carried out based on the variable level of the presence reading signals and/or based on the binary mask.

In some example embodiments, one contiguous subarea can be classified as representing two discrete occupying objects on the support layer 8. For example, when a person stands with two feet joined together, the two feet of the person can be detected as a single contiguous subarea. However, based on properties of this subarea, the subarea may be classified as representing two feet.

In some example embodiments, two or more proximately located but discrete contiguous subareas can be classified as representing a single occupying object. For example, a shoe having a heel that is located remotely of a front portion of the sole (ex: in the case of a high-heel shoe) can be detected as two discrete subareas. However, based on the relative position and sizes of these subareas, they may be classified as presenting a single foot. A dynamic analysis of the detected objects can be applied to categorized detected occupying objects. This dynamic analysis may include analysing combinations of contiguous subareas to categorize occupying objects and/or analysing detected occupying objects over time to categorize these objects.

The indicator of occupancy status can also indicate the occupancy level, which corresponds to an indicator of how much of the top surface 16 of the support layer 8 is currently being occupied by an occupying object. This occupancy level can be determined in addition to the classifying of the detected occupying objects. Alternatively, the occupancy level can be determined instead of classifying the detected objects.

In one example embodiment, the detection area defined by the top surface 16 of the support layer 8 can be pre-divided into sectors or quadrants. The occupancy level can be determined based on the number of sectors or quadrants presently being occupied by an occupying object. It will be appreciated that this determination can be useful to determine how much of the area of the top surface 16 is available for occupation by other occupying objects.

Figure 5B:
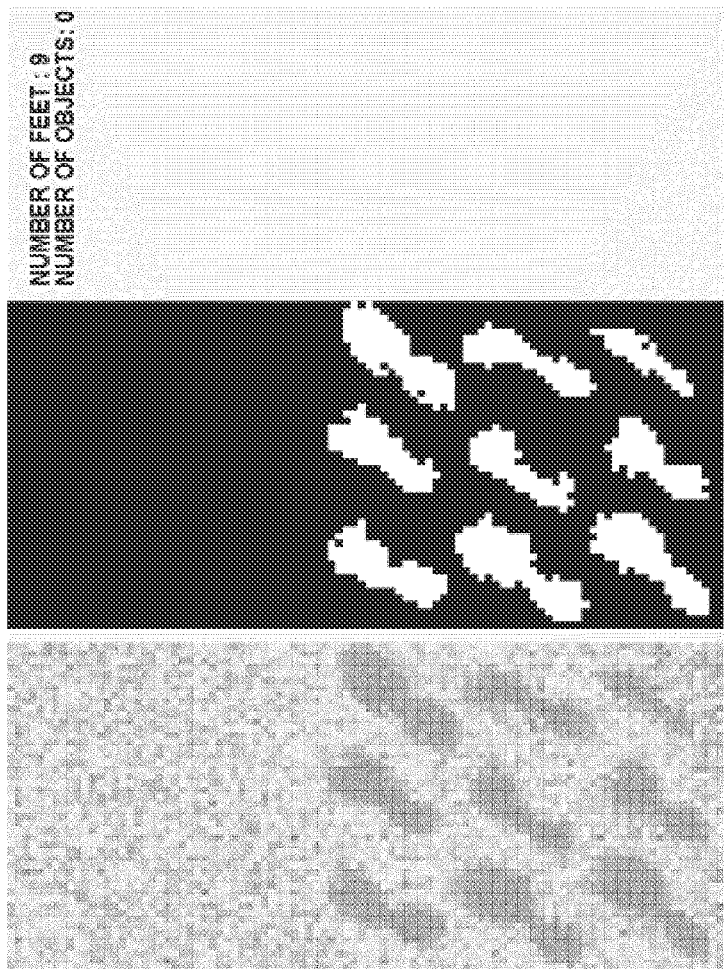
FIGS. 5B and 5C illustrate further graphical representations that are generated from placement of occupying objects on the support layer.
Figure 5B:
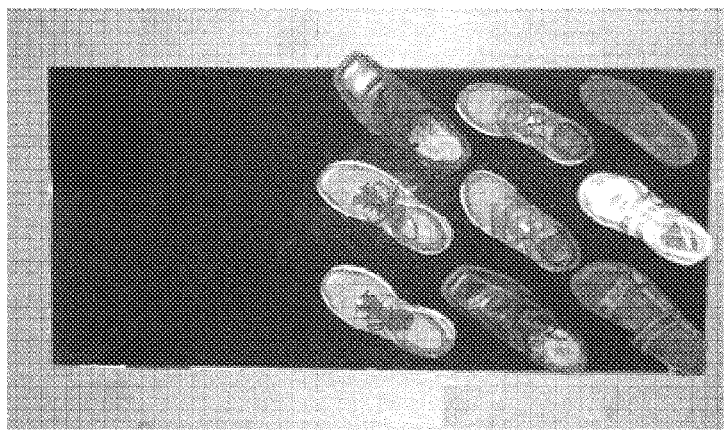
Figure 5C:
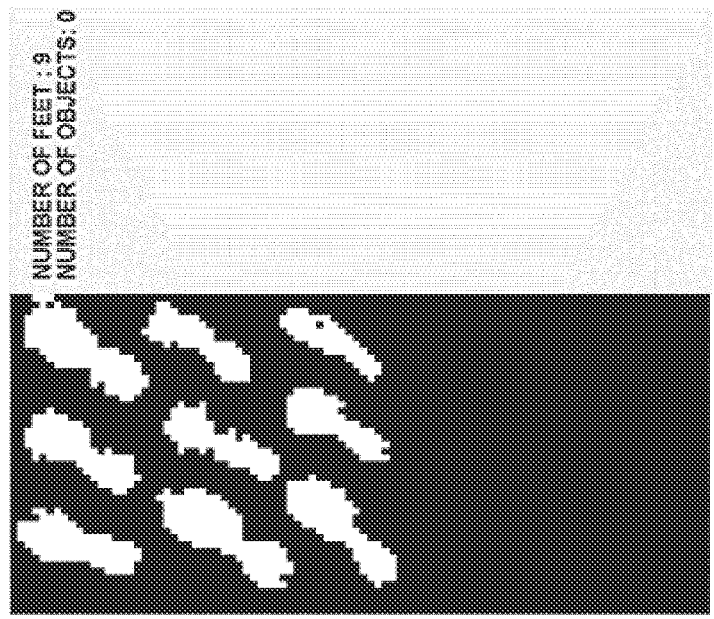
Figure 5C:
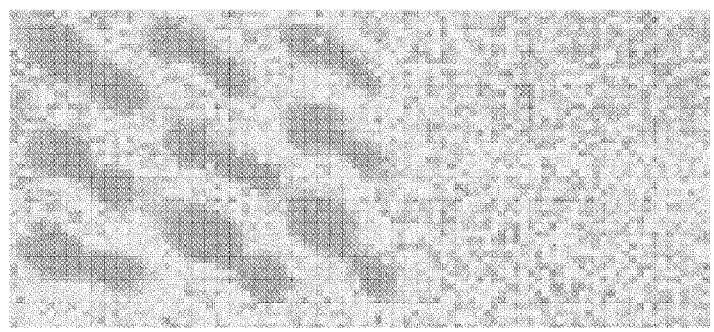
Figure 5C:
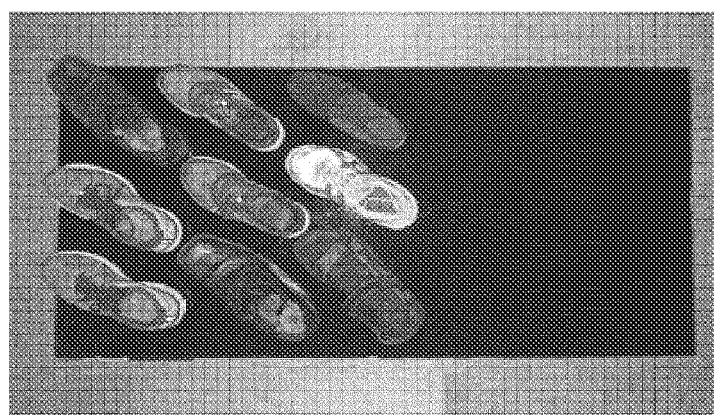

FIGS. 5B and 5C illustrate further graphical representations that are generated from placement of occupying objects on the support layer 8.

Figure 6A:
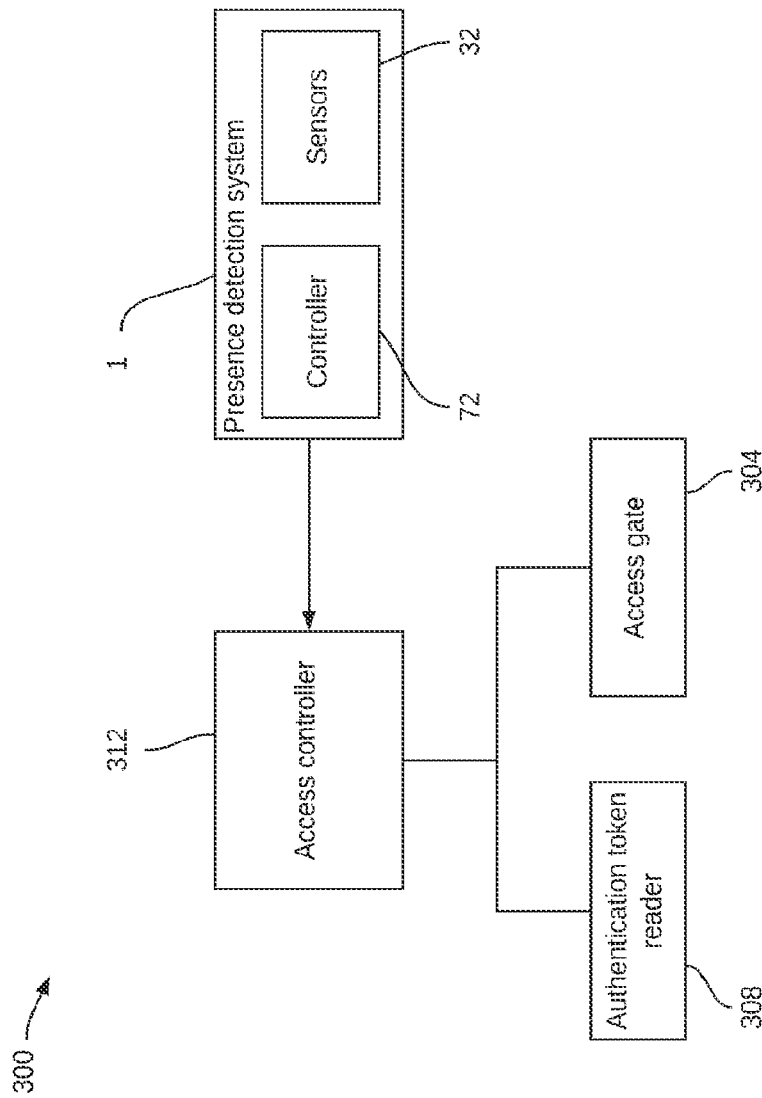
FIG. 6A illustrates a schematic diagram of a security control system integrating a presence detection system according to an example embodiment.

Referring now to FIG. 6A, therein illustrated is a schematic diagram of a security control system 300 integrating the presence detection system 1 described herein according to various example embodiments. The security control system 300 can be an access gate system and includes the access gate 304 and an authentication token reader 308. The access gate 304 can be selectively opened or closed to selectively grant physical access to a person to a controlled area. The authentication token reader 308 is operable to read an identification code and/or an authentication code of a token, such as a keycard, password, biometric object, or the like, provided by a human user requesting access to the controlled area.

An access controller 312 receives the identification code and/or the authentication code and determines whether access should be granted. For example, rules for providing access can be stored within the access controller 312 or at a storage in communication with the access controller 312.

The access controller 312 may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The access controller 312 is further in communication with the controller 72 of the presence detection system 1 of the security control system 300. The presence detection system 1 is installed in proximity of the access gate 304. In particular, the support layer 8 of the presence detection system 1 should be installed at location between the controlled area and an open area (an area that does not require authorization). Accordingly, the human user wishing to enter the controlled area from the open area must walk onto and across the support layer 8. For example, the support layer 8 can be located immediately in front of the access gate 304.

The presence detection system 1 detects the presence of the human user crossing over the support layer 8 of the presence detection system 1 and outputs the indicator of occupancy status to the access controller 312. The indicator of occupancy status in this application may indicate the number of human feet present on the support layer 8. The occupancy status in this application may also indicate the presence of one or more non-human objects.

The access controller 312 is configured to transmit a signal to the access gate 304 to open the gate 304 based on a combination of the reading of the identification code and/or authentication token and the received indicator of occupancy status. For example, the access controller 312 is configured to transmit an open gate signal to the access gate 304 (to operate the access gate from a blocking position to an access position) only in a situation where an authenticated user token is read by the authentication token reader and a non-permitted occupancy status is not detected by the presence detection system 1. The access controller 312 can be configured to operate the access gate to the blocking position upon detecting a non-permitted occupancy status in the indicator received from the present detection system 1. This detecting of the non-permitted occupancy status can override the reading of the authenticated user token from the authentication token reader 308.

The non-permitted occupancy status can correspond to the indicator of occupancy status from the presence detection system 1 indicating the presence of more than one human being present on the support layer 8. This condition can correspond to the controller 72 detecting three or more occupying objects on the support layer 8 of the human foot type. It will be appreciated that this non-permitted occupancy status corresponds to a situation of tailgating. This condition can also correspond to the controller 72 detecting two or more humans being supported on the support layer 8. This condition can also correspond to the controller 72 detecting one human and at least one non-human object being supported on the support layer (ex: a human carrying a suitcase or other transport case being supported on the support layer where such cases are non-permitted). Some exceptions may be made to the non-permitted occupancy status that causes overriding the reading of the authenticated user token. For example, the presence of one human and one or more non-human objects detected as being objects used to aid the mobility of that human (ex: a cane or crutches) can be such an exception and the reading of the authenticated user token is not overridden in such circumstances.

Other non-permitted occupancy statuses include no objects of the human foot type being detected and a non-authorized person entering the controlled area via a gate while another person is exiting the controlled area through that gate.

As describe elsewhere herein, the presence detection system 1 can be installed in proximity of the access gate 304 so that the support layer 8 is flush with flooring elements 200 surrounding the presence detection system 1. Accordingly, the users using the security system 300 will have a user experience that is substantially the same as a system without the presence detection system 1.

It was observed that various existing system for detecting tailgating instances are prone to detect false positives of tailgating, which can result in a poor user experience. It was further observed that use of the presence detection system 1 described herein according to various example embodiments within a security control system can achieve effective accuracy while lowering instances of false positives.

According to a method for detecting presence in the context of operating an access gate, a user token is read by an authentication device. The access gate is operated in response to reading an authenticated user token to cause the gate to enter an access position. However, upon determining more than one human being supported on a support layer associated to the access gate, the access gate is operated to a block position to prevent access. This operation of the access gate to the blocking position overrides the reading of the authenticated user token. As described elsewhere herein, some exceptions can be applied to overriding the reading of the authenticated user token, such as where the additional object(s) detected with the human supported on the support layer are object(s) used for aiding mobility of that human.

Figure 6B:
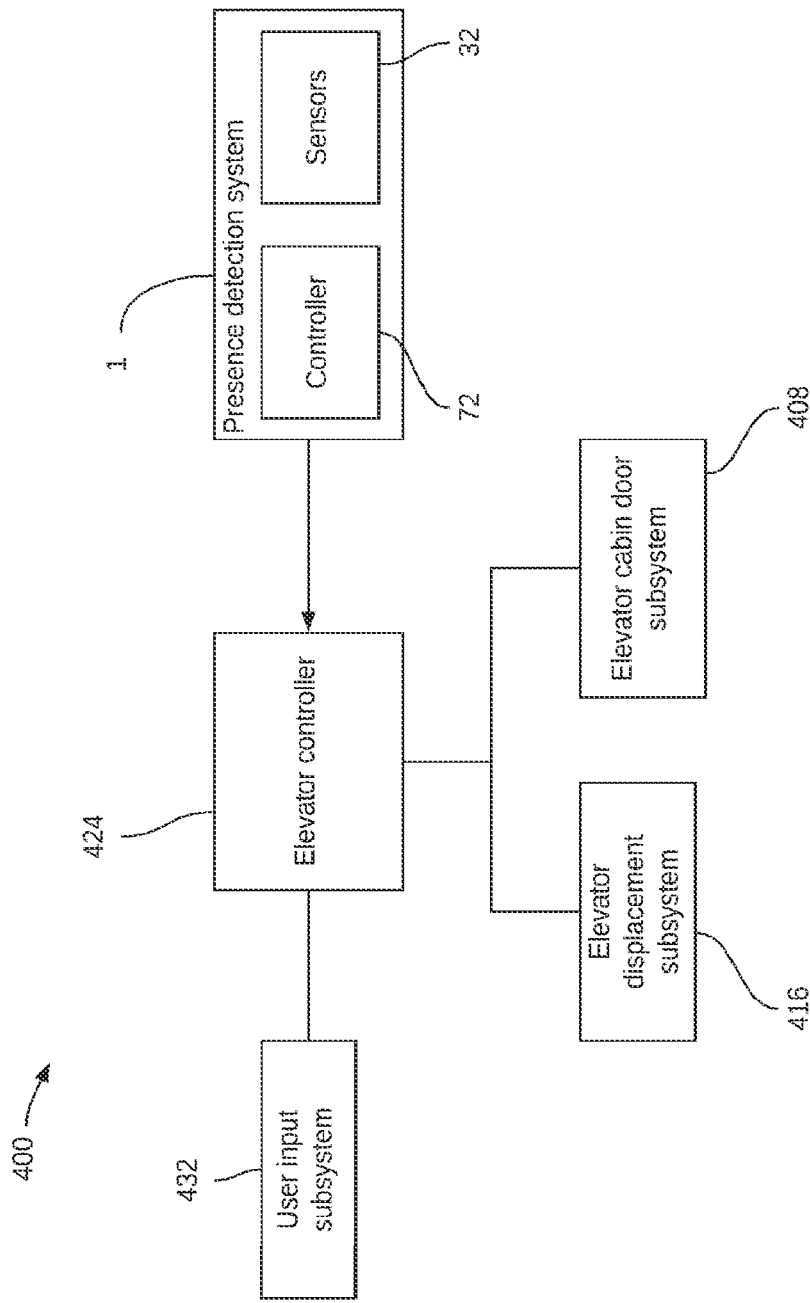
FIG. 6B illustrates a schematic diagram of an elevator system integrating the presence detection system according to an example embodiment.

Referring now to FIG. 6B, therein illustrated is a schematic diagram of an elevator system 400 integrating the presence detection system 1 described herein according to various example embodiments. The elevator control system 400 includes an elevator cabin that is displaceable upwardly and downwardly between storeys of a building. The elevator cabin has cabin doors that can be opened to allow entrance and exit from the elevator cabin and a cabin floor that support users travelling on the elevator system 400.

An elevator door control subsystem 408 is operable to cause the cabin doors to open or close.

An elevator displacement subsystem 416 is operable to selectively cause the elevator cabin to move upwardly towards an upper storey, move downwardly towards a lower storey or pause displacement of the elevator cabin.

The elevator system 400 further includes an elevator operation controller 424 that is operable to emit door control signals to the elevator door control subsystem 408 to open or close the cabin doors and to emit displacement control signals to the elevator displacement subsystem 416 to displace the elevator cabin. The elevator system 400 further includes a user input subsystem 432 that receives user input commands for calling the elevator cabin to a particular storey. The user input subsystem 432 includes the user control panel located inside the cabin (for a user to call the elevator to a desired destination storey) and user control panels located on each storey outside the cabin (for a user to call the elevator to stop at that storey).

The elevator operation controller 424 may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The elevator operation controller 424 is further in communication with the controller 72 of the presence detection system 1. The presence detection system 1 of the elevator system 400 is placed over the floor of the cabin. For example, the top surface 16 of the support layer 8 can cover the entirety of the floor of the cabin. Accordingly, the presence detection system 1 is operable to detect any objects entering the cabin and being supported by the floor of the cabin. The indicator of occupancy status in this application may provide an occupancy level of the elevator, corresponding to the "fullness" of the elevator cabin. Importantly, the occupancy level provides an indicator of whether there is room within the elevator cabin to accommodate additional passengers. The occupancy level can be indicated according to various example embodiments described herein, such as a percentage of occupancy and/or whether sectors of the support layer 8 are occupied or unoccupied.

The occupancy level is useful for operating the elevator cabin in an efficient way. In particular, the elevator operation controller 424 can be configured to operate the elevator cabin in a way that overrides commands for calling the elevator entered using the user input subsystem 432 based on the occupancy level indicated by the presence detection system 1.

In one operational context, the elevator controller 424 can be configured to cancel all user input commands made via a user panel of the user input subsystem 432 located inside the elevator cabin upon detecting that the cabin is empty (i.e. not detected objects). This situation may occur where a user erroneously entered commands to call the elevator cabin to different storeys. After the user leaves the cabin at one of the storeys, the elevator controller 424 can cancel the other user inputted command calling the cabin to another storey.

In another operational context, the elevator controller 424 can override user input commands made via a user panel of the user input subsystem 432 located outside of the cabin upon detecting that the occupancy level of the cabin exceeds a predetermined occupancy threshold. For example, upon detecting this occupancy level during a downwardly operation of the elevator cabin, the elevator controller 424 can cause the elevator displacement subsystem 416 to continue the downwardly operation of the elevator cabin and override received user inputted commands requesting the elevator to stop at lower storeys. It will be appreciated that in this context, when an elevator is descending, all of the passengers typically wish to stop at a bottom storey of a building (ex: lobby floor or parking floor). When the elevator cabin is full, passengers on lower floors cannot be accommodated within the elevator cabin. Accordingly, continuing downward displacement of the elevator to the bottom storeys of the building increases efficiency in the operation of the elevator while avoiding uselessly stopping the elevator cabin when no further passengers can enter the cabin.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A presence detection system, the system comprising:
a support layer operable to act as an underlying surface for supporting one or more objects;
a sensor layer disposed beneath the support layer and operable to output readings indicating a presence of one or more objects supported on the support layer; and
a controller configured for:
receiving the readings from the sensor layer; and determining, based on the readings, an indicator of an occupancy status of the support layer, the indicator of the occupancy status of the support layer comprising an indicator of a number of humans being supported on the support layer;
wherein the sensor layer comprises a plurality of photosensors each operable to output a respective sensor reading indicating whether an object supported on the sensor layer is obstructing light thereto;
wherein the indicator of the number of humans being supported on the support layer indicates a number of human feet being supported on the support layer; and
wherein the determining comprises:
detecting, based on the sensor readings, one or more groups of adjacently located sensors having readings indicating the presence of the object; and
determining, for each group, from the readings, whether the readings for the group are representative of the presence of a human foot.

2. The presence detection system of claim 1, wherein the plurality of photosensors is arranged in an array, each photosensor being located under a corresponding subarea of the support layer and being configured to output the respective sensor reading indicating the presence of an object on said subarea of the support layer.

3. The presence detection system of claim 1, wherein the support layer is partially translucent and reduces visibility of the sensor layer through a top surface of the support layer.

4. The presence detection system of claim 3, wherein the top surface of the support layer is an anti-slip surface.

5. The presence detection system of claim 3, wherein the support layer comprises a sub-layer formed of a translucent film.

6. The presence detection system of claim 1, wherein the indicator of the occupancy status of the support layer comprises an indicator of an occupancy level of the support layer by objects being supported on the support layer.

7. The presence detection system of claim 6, wherein the plurality of photosensors is arranged in an array, each sensor being located under a corresponding subarea of the support layer and being configured to output the respective sensor reading indicating the presence of an object on said subarea of the support layer.

8. The presence detection system of claim 7, wherein the indicator of the occupancy level of the support layer by objects being supported on the support layer indicates a percentage of the area of the support layer being occupied by the objects.

9. The presence detection system of claim 1, wherein each photosensor from the plurality of photosensors is configured to output:
a first value when no object is present on the support layer; and
a second value, different from the first value, when the object is present on the support layer.

10. The presence detection system of claim 9, wherein the first value and the second value are non-binary values, the non-binary values being representative of a level of light reaching a corresponding one of the photosensor from the plurality of photosensors.

11. The presence detection system of claim 1, wherein the plurality of photosensors each have a refresh rate of at least 20 times per second.

12. The presence detection system of claim 1, wherein the plurality of photosensors is oriented to define a detection cone, the detection cone being oriented generally transversely to the sensor layer.

13. An access gate system comprising:
the presence detection system according to claim 2;
an authentication token reader configured for reading a user token;

an access gate operable between a blocking position and an access position; and an access controller operatively connected to the presence detection system, the authentication device and the access gate and configured for:

operating the access gate from the blocking position to the access position in response to reading an authenticated user token by the authentication token reader; and upon the presence detection system detecting more than one human being supported on the support layer, operating the access gate to the blocking position, wherein said operating of the access gate overrides the reading of the authenticated user token.

14. The access gate system of claim 13, wherein detecting more than one human being supported on the support layer comprises detecting one human and at least one non-human object being supported on the support layer.

15. The access gate system of claim 13, wherein detecting more than one human being supported on the support layer comprises detecting at least three feet being supported on the support layer.

16. The access gate of claim 13, wherein detecting more than one human being supported on the support layer comprises detecting two or more humans being supported on the support layer.

17. The access gate system of claim 13, further comprising:

a plurality of flooring elements surrounding the support layer, wherein a top surface of the support layer is substantially level with the top surface of the flooring elements.

18. An elevator system comprising:

an elevator cabin having cabin doors and a cabin floor;

an elevator door subsystem operable to selectively open and close the cabin doors;

an elevator displacement subsystem operable to selectively displace the elevator cabin upwardly, displace the elevator cabin downwardly, and pause displacement of the elevator cabin downwardly;

the presence detection system according to claim 6 positioned over the cabin floor of the elevator cabin; and an elevator operation controller operatively connected to the presence detection system, the elevator door subsystem and the elevator displacement subsystem and configured for controlling the elevator door subsystem and the elevator displacement subsystem based on the indicator of the occupancy level of the support layer by objects being supported on the support layer.

19. The elevator system of claim 18, further comprising:

a user input subsystem for receiving user inputted commands for calling the elevator cabin; and wherein the elevator operation controller is configured for:

if the occupancy level of the support layer exceeds a predetermined occupancy threshold during a downwardly operation of the elevator cabin, operating the revelator displacement subsystem to continue downward displacement of the elevator cabin and overriding receiving user inputted commands requesting entering the elevator cabin.

20. The elevator system of claim 18, further comprising:

an authentication token reader configured for reading a user token; wherein the elevator operation controller is configured for:

if the occupancy level indicates a number of humans being supported by the support layer being different from a number of user tokens read by the authentication toke reader, preventing displacement of the elevator cabin.

21. A method for detecting presence, the method comprising:

detecting, using a sensor layer disposed beneath a support layer, the sensor layer comprising a plurality of photosensors each operable to output a respective sensor reading indicating whether an object supported on the support layer is obstructing light thereto; and determining, based on readings outputted from the sensor layer, an indicator of an occupancy status of the support layer by objects being supported on the support layer, the indicator of the occupancy status of the support layer comprising an indicator of the number of humans being supported on the support layer;

wherein the indicator of the number of humans being supported on the support layer indicates a number of human feet being supported on the support layer; and wherein the determining comprises:

detecting, based on the sensor readings, one or more groups of adjacently located sensors having readings indicating the presence of an object; and determining, for each group, from the readings, whether the readings for the group are representative of the presence of a human foot.

22. The method of claim 21, wherein the indicator of the occupancy status of the support layer by objects being supported on the support layer indicates a percentage of the area of the support layer being occupied by the objects.

23. The method of claim 21, further comprising: reading, by an authentication device, a user token;

in response to reading an authenticated user token, operating an access gate to access position; and upon determining more than one human being supported on the support layer, operating the access gate to a blocking position, wherein said operating of the access gate overrides the reading of the authenticated user token.

24. The method of claim 23, wherein detecting more than one human being supported on the support layer comprises detecting one human and at least one non-human object being supported on the support layer.

25. The method of claim 23, wherein detecting more than one human being supported on the support layer comprises detecting at least three feet being supported on the support layer.

26. The method of claim 23, wherein detecting more than one human being supported on the support layer comprises detecting two or more humans being supported on the support layer.

27. The method of claim 21, further comprising outputting, with each photosensor from the plurality of photosensors:

a first value when no object is present on the support layer; and a second value, different from the first value, when the object is present on the support layer.

28. The method of claim 27, wherein the first value and the second value are non-binary values, the non-binary values being representative of a level of light reaching a corresponding one of the photosensor from the plurality of photosensors.

* * * * *